(12) United States Patent
Ponomarenko

(10) Patent No.: US 7,053,359 B2
(45) Date of Patent: May 30, 2006

(54) OPTICAL MULTI-GATE DEVICE AND METHOD

(75) Inventor: Dimitry Ponomarenko, Petah Tikva (IL)

(73) Assignee: Dmitry Ponomarenko, Petach Tivka (IL)

( * ) Notice: Subject to any disclaimer, the term of this patent is extended or adjusted under 35 U.S.C. 154(b) by 0 days.

(21) Appl. No.: 11/121,809

(22) Filed: May 3, 2005

(65) Prior Publication Data

US 2005/0211881 A1  Sep. 29, 2005

Related U.S. Application Data

(63) Continuation of application No. 10/008,599, filed on Dec. 3, 2001, now abandoned.

(51) Int. Cl.
*G01J 4/00* (2006.01)
*G01B 9/10* (2006.01)

(52) U.S. Cl. ............... 250/227.19; 250/227.27; 385/31; 359/107; 356/477

(58) Field of Classification Search ........ 250/225–226, 250/227.11, 227.19, 227.21, 227.27; 356/477; 385/12, 31, 33
See application file for complete search history.

(56) References Cited

U.S. PATENT DOCUMENTS

| | | | |
|---|---|---|---|
| 4,262,992 A | | 4/1981 | Berthold, III |
| 5,093,802 A | | 3/1992 | Hait |
| 5,225,887 A | * | 7/1993 | Lipson et al. ............. 356/477 |
| 5,473,712 A | | 12/1995 | Blow et al. |
| 5,712,937 A | | 1/1998 | Asawa et al. |
| 5,793,905 A | | 8/1998 | Maier et al. |
| 5,999,304 A | * | 12/1999 | Sanders et al. ............. 359/237 |
| 6,163,632 A | | 12/2000 | Rockman et al. |
| 6,639,681 B1 | | 10/2003 | Magne et al. |

FOREIGN PATENT DOCUMENTS

| | | |
|---|---|---|
| EP | 01 174 759 | 1/2002 |
| WO | WO 01/67607 | 9/2001 |

OTHER PUBLICATIONS

Gatti E et al. "Logical Operations by interferometric Techniques," Electronic Letters, Dec. 13, 1968, UK, vol. 4, No. 25, pp. 556-557.

* cited by examiner

*Primary Examiner*—Stephone B. Allen
*Assistant Examiner*—Patrick J. Lee
(74) *Attorney, Agent, or Firm*—Edwards Angell Palmer & Dodge LLP

(57) ABSTRACT

A logical element including an optical junction coupled to at least two optical inlets and to at least one optical outlet. Incoming light beams of coherent monochromatic light beams and the same uniform frequency are applied to the optical inlets, and their super-positioning is provided as an outgoing light beam(s) via the optical outlet to another logical element or to a light intensity gauge. The light intensity gauge measures light intensity in specific zone(s) of an interference pattern created by the outgoing light beam, dependent on phase shift difference between the components of the incoming light beams, and the measured intensity is correlated with intensity ranges predetermined to conjugate to logical integer values, such as Boolean or other integer numeric values. A multiplicity of logical elements can be installed to provide an optical processor. Parallel use of the same logical element is provided by the simultaneous application of sets of light beams. The sets do not interact with each other by means of differing characteristics, such as different frequencies, or polarizations of the sets. A corresponding method is also provided.

81 Claims, 20 Drawing Sheets

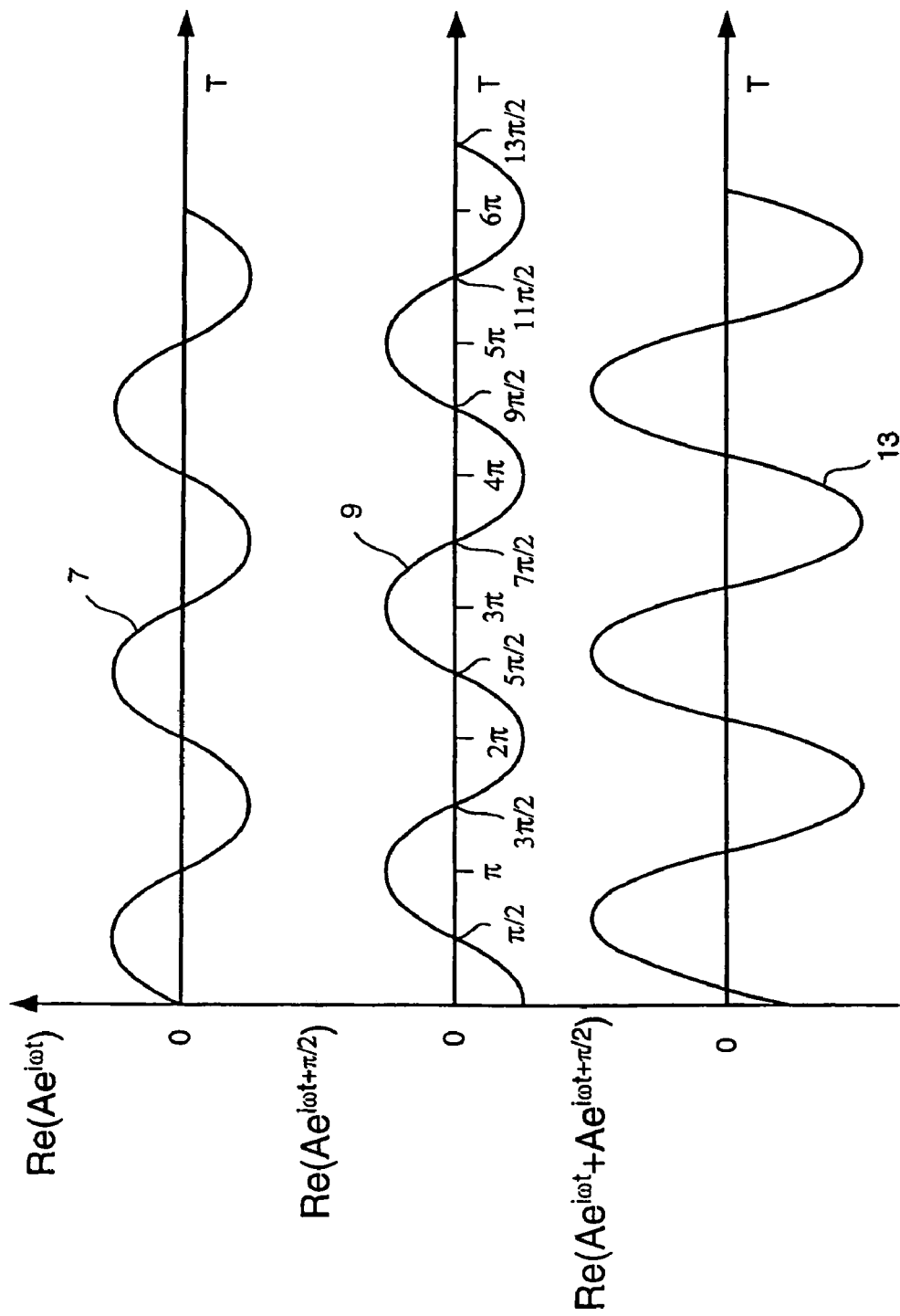

OPTICAL MULTI-GATE DEVICE AND METHOD

CROSS-REFERENCE TO RELATED CASE

This is a continuation of U.S. patent application Ser. No. 10/008,599, filed on Dec. 3, 2001 now abandoned, the entirety of which is incorporated herein by reference.

FIELD OF THE INVENTION

The present invention relates to optical signal processing and switching, and more particularly to multi-gate devices for processing optical energy in logical devices, switching, commutation and computing optical signals, light amplification, energy control, optical waveguides communication, data transmission and computer circuitry, including arithmetic and logic units.

BACKGROUND OF THE INVENTION

Contemporary technology prevalently involves electric currents for the operation of transistors and other electronic devices. The velocity of electric signals through conductors and semi-conductors, namely—the response time of the (semi)-conductor to the input of an electric signal, is bounded by the physical limits of electric currents. A prolonged response time curbs the operational efficiency of the electronic device. For example, the speed of electric current through a conducting medium is about 6,000 km/sec and through a semi-conductor, such as a PN transistor is about 100 km/sec. In a transistor, a small power electronic signal ("base") is used to control the amplification of a second electronic signal ("collector"), whose output ("emitter") is thus selectively amplified. A typical transistor includes semiconductor media in which the speed of electrons as information bearers is as mentioned above. A processor typically contains 1 Million to 10 Million transistors.

For example, Pentium III® processor manufactured by Intel® is known to include around 7.5 Million transistors. A typical electronic path in a transistor is 0.18 microns, thus a typical path in a processor could extend to 1.5 meters. The conduction of electric current through electronic devices, such as conductors, transistors, resistors, coils and capacitors, encounters inevitable retarding forces that decelerate the electrons and diminish the electric current. These forces lead to the heating of the electronic device (with impractical exceptions such as 'super-conductors'). The intrinsic heating of transistors, which are condensed by millions in electronic devices such as processors, may lead to damaging overheating. Overheating is avoided by taking different measures. In case of processors, the processing speed is reduced and in case of electronic devices, the capacity of the electronic device is reduced. In all cases, the overheating of the electronic device is avoided in different ways, such as, installing cooling fins, electric fans, operating in a relatively cold environment, and the like). In order to reduce overheating, the electric current has to be limited. Operating at a lower current causes a transistor to operate at a lower switching rate, and thus, in case of a processor, the number of operations per unit time is reduced. For example, current Pentium IV® processors and their equivalents are designed to handle operations in the scale of Gigaflops ("flops" means—floating point operations per second), in a properly cooled environment. The passage of electric currents also requires minimal dimensions of the physical conductor and a minimal energy for the operation thereof, and is also subject to physical manufacturing limits. Minimal energy E is required, for instance, for turning a device on and off, and is given by $E = \ln 2 \cdot k \cdot T$, wherein ln2 is the natural logarithm of 2, k is Boltzmann's constant, and T is the temperature of the device in degrees Kelvin. Kazimir's Effect, wherein electric current is blocked by the pressure exerted by the spontaneous appearance of external elementary particles, also requires minimal sizing of the conducting medium—above 50 nanometers—to avoid such blockage. In addition, a parallel use of an electronic device, namely—the simultaneous operation of a single device for performing multiple operations, is almost impossible due to the mutual interfering of electric currents within the device.

Devices known in the prior art involve optical signal manipulation. U.S. Pat. No. 5,093,802 issued to Hait, teaches the use of modulated input beams that are able to produce interference fringes. The interference fringes are separated into constructive interference component regions and destructive interference component regions. Thus, output from individual functions is provided, that results from the interference which occurs in the separated interference-fringe component regions. This provides a logic circuit element, wherein the Boolean value of such a component, which is associated with its brightness, will be a function of values of the input beams. Mask separators with holes, or holograms made up of many subholograms are used to separate fringe component regions, and to direct function interconnecting beams.

Another device is disclosed in U.S. Pat. No. 5,793,905 issued to Maier et al., which teaches the switching of two incoming linearly polarized beams having orthogonal polarization. The disclosed invention requires employment of GaAs crystal as an anisotropic, birefringent object, for affecting the polarization of the outgoing light, whose intensity depends strongly on the intensity of one of the incoming beams. Thus the device can operate as an optical equivalent of an electronic device based on transistors.

SUMMARY OF THE PRESENT INVENTION

It is an object of the present invention to provide a system and a method for performing logical functions with optical light waves while eliminating the necessity of using electronic currents for operating such functions, that overcome the disadvantages of the prior art.

In accordance with the present invention, there is thus provided a logical element having an optical junction, at least two optical inlets, coupled with the optical junction, and at least one optical outlet coupled with the optical junction. According to another aspect of the present invention, there is thus provided an optical circuitry incorporating a plurality of optical circuitry elements. The optical circuitry elements include at least one optical logical element. The optical logical element includes an optical junction, at least two optical inlets, coupled with the optical junction, and at least one optical outlet coupled with the optical junction.

According to a further aspect of the present invention, there is thus provided an optical device for performing a logical operation. The optical device includes an optical junction, at least two optical inlets for receiving at least two incoming light beams, and at least one optical outlet at which at least one outgoing light beam is emitted. The two incoming light beams are superposed at said optical junction, thereby producing at least one outgoing light beam.

In accordance with the present invention, there is also provided a method for performing logical functions using at least one group of light beams. Each group of light beams includes a plurality of light beams, and being defined by at least one property and shares a distinctive characteristic. The method includes the procedure of superposing the plurality of light beams in an optical junction, thereby producing at least one superposed light beam sharing the distinctive characteristic.

BRIEF DESCRIPTION OF THE DRAWINGS

The present invention will be understood and appreciated more fully from the following detailed description taken in conjunction with the drawings in which:

FIG. 2C is a graphical illustration of two coherent light beams of equal frequency and an arbitrary phase shift difference, and the result of superposing these two light beams in a Fresnel zone, as known is the art;

DETAILED DESCRIPTION OF PREFERRED EMBODIMENTS

The present invention provides a system and a method for performing logical functions by employing optical light waves, thereby eliminating the use of electrical currents for operating such logical functions. A logical function is performed by superposing two incoming light beams at an optical junction, thereby producing an outgoing light beam. The phases and amplitudes of the incoming light beams define the characteristics of the outgoing light beam. A predetermined logical value—which is a function of the characteristics of the outgoing light beam, is determined when the outgoing light beam is detected.

Figure 1:
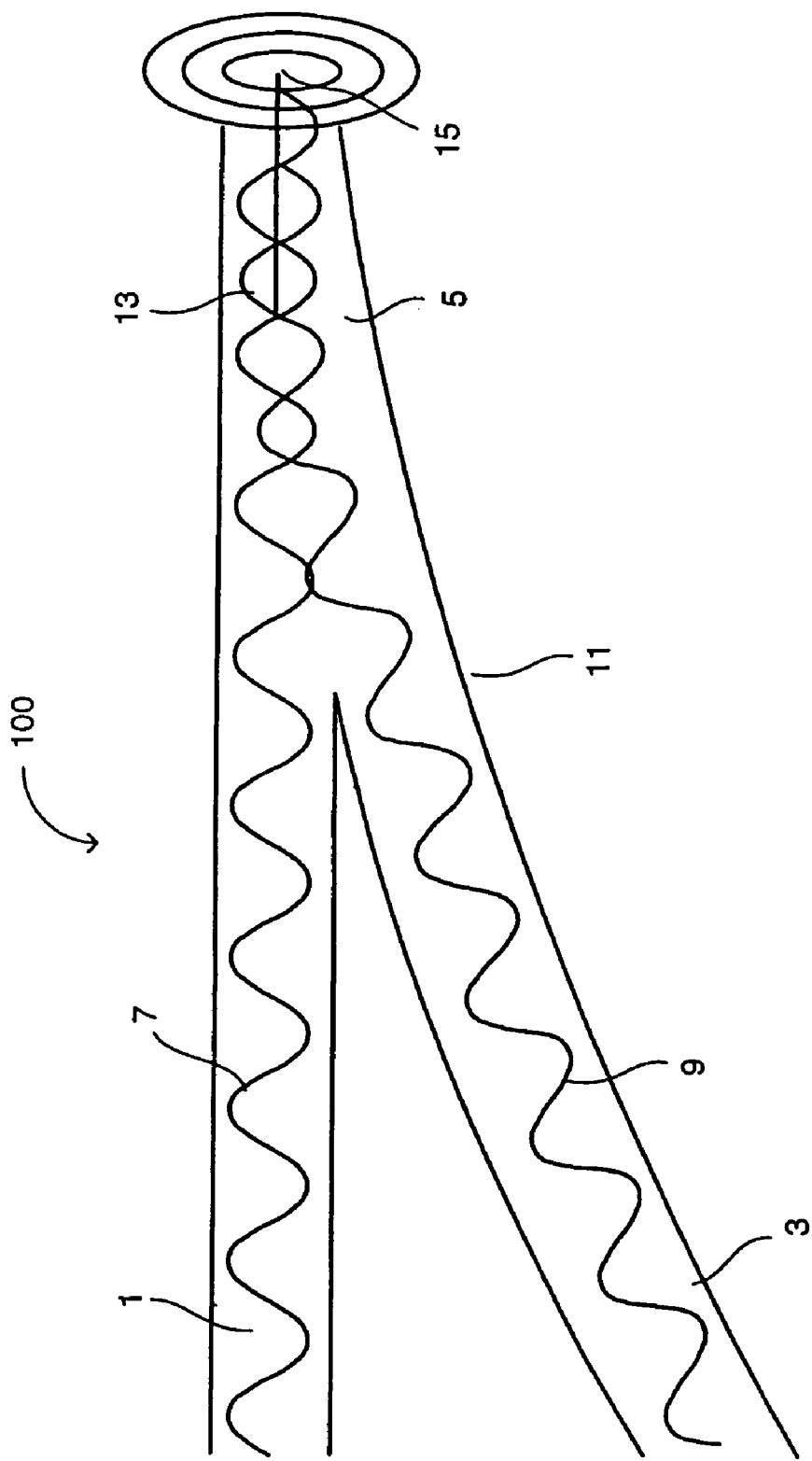
FIG. 1 is a schematic illustration of a system constructed and operative in accordance with a preferred embodiment of the present invention.

Reference is now made to FIG. 1, which is a schematic illustration of an optical device, generally referenced 100, constructed and operative in accordance with a preferred embodiment of the present invention. Device 100 includes an inlet 1, an inlet 3 and an outlet 5, all of which are capable of guiding waves there through. Inlets 1 and 3 and outlet 5 are coupled together to form an optical junction, or an optical gate, in which incoming light beams 7 and 9 are superposed in a common zone—in junction 11, and emitted as outgoing light beams through outlet 5. Wavelengths suitable for operation with device 100 are not bounded, except for radiation that is damaging to the physical elements involved. Suitable photon radiation may typically include visible light, infra-red, ultra violet, microwaves and so forth, and is also referenced herein below as "light", "waves", "light beams" or "optical frequencies".

However, the present invention is not limited to any specific frequency range, and any electromagnetic beam suitable for guidance can be employed. Hence, conduction through wave-guides or conduits is applicable as long as the interaction of beams with the conveying medium or the sides of the conduit is insignificant. The conveying medium may include optical fiber, fluid (i.e., gaseous or liquid confined by a conduit "piping"), vacuum defined by the conduit geometry, and the like. It will be appreciated by those skilled in the art, that the fading of light in vacuum or in other media such as conventional optical fiber, is almost negligible for the purposes relevant to the present invention.

For example, a 633 nm light beam will lose coherence after traveling through 1 meter of a conventional fiber-optic wave-guide. The conduit sides reflect optical waves with a mirror like effect, namely—reflectivity of almost 100%, especially with aluminum coated side walls. The linking of inlets 1 and 3 in junction 11 is practically seamless, as known from the use of fiber-optic, vacuum or gaseous wave-guides. The geometrical acute angle between inlets 1 and 3 also ensures that incoming light beams will not practically "turn" or "leak" from inlet 1 to inlet 3 and vice versa.

When a coherent monochromatic light beam 7 encounters another monochromatic coherent light beam 9, wherein both light beams have the same uniform frequency (wavelength) and polarization, but different phase shifts, the two light beams 7 and 9 will interfere to give a resultant "disturbance" or "interference" light beam 13. It will be noted that the terms "phase" and "phase shift" are used herein synonymously. The irradiance of light beam 13, also termed flux density or light intensity at a specific locus, is a function of the phase difference, a phenomenon known as interference. An interference pattern appears, when projected on a crossing surface, as alternately bright and dark concentric rings of varying flux density running perpendicular to the line of propagation of light beam 13.

The central wave front of the light wave at outlet 5 conforms to a 'Fresnel zone'. The central area of this pattern is of particular interest when such a plane is cut off around its center to check its light intensity. The light intensity can be measured using an optical detector such as a photovoltaic detector, a thermal photodetector, and the like. The device employed for measuring the intensity of the Fresnel zone is hereinafter referred to as a "screen".

Figure 2A:
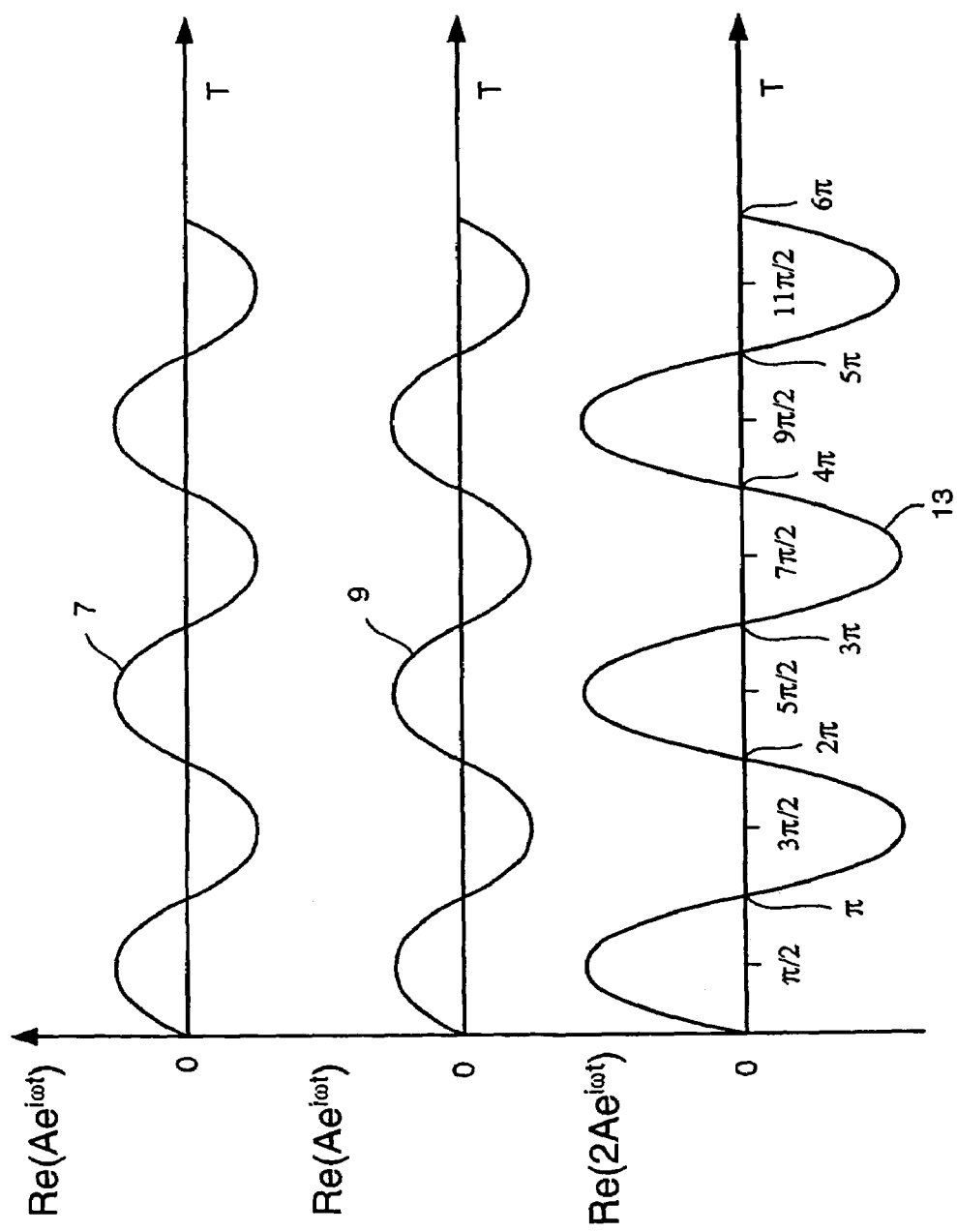
FIG. 2A is a graphical illustration of two coherent light beams of equal frequency and the same phase shift, and the result of superposing these two light beams in a Fresnel zone, as known is the art.
Figure 2B:
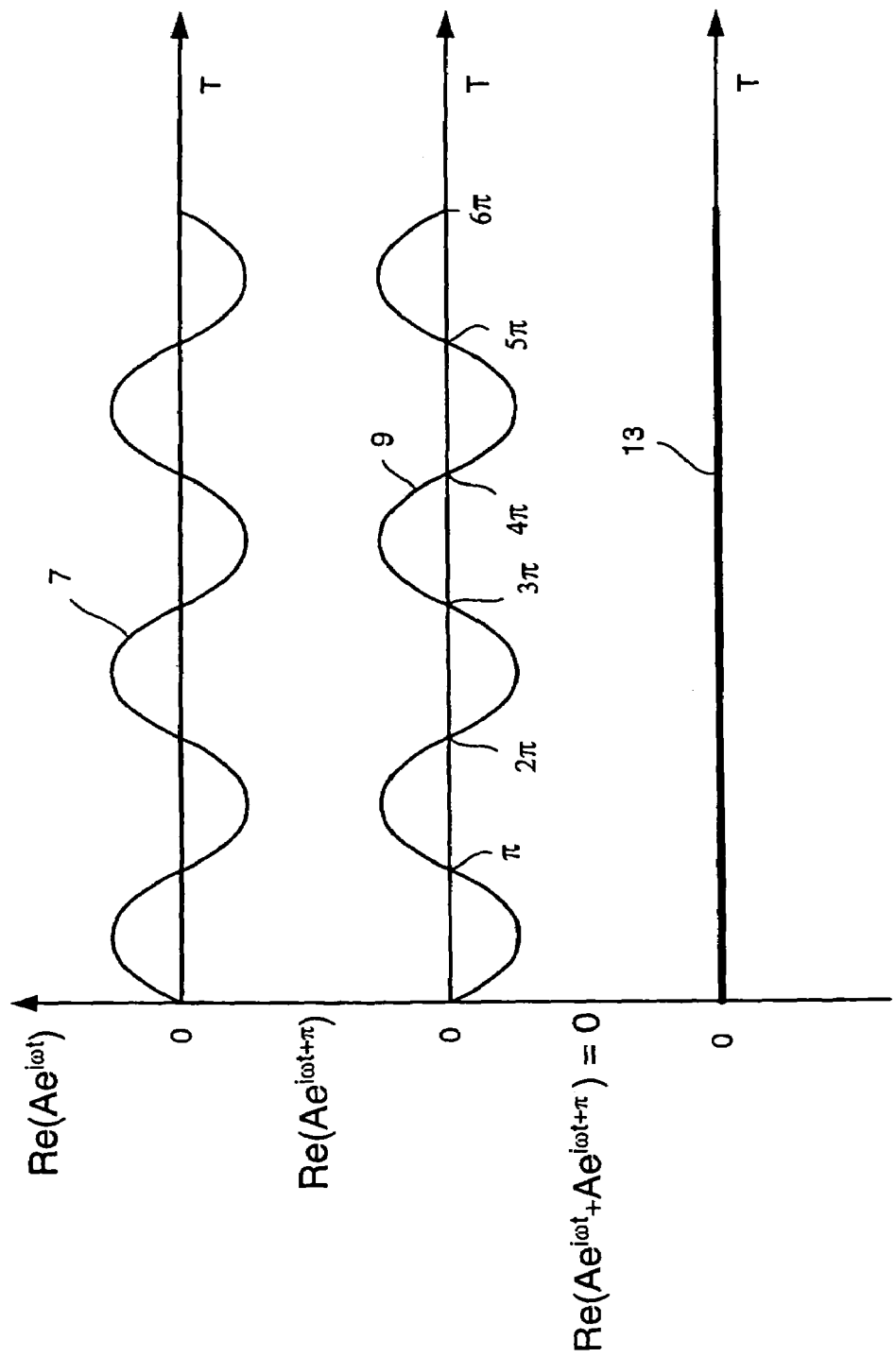
FIG. 2B is a graphical illustration of two coherent light beams of equal frequency but phase shift difference of 180 degrees, and the result of superposing these two light beams in a Fresnel zone, as known is the art.

Reference is further made to FIGS. 2A, 2B and 2C. FIG. 2A is a graphical illustration of two coherent light beams of equal frequency and the same phase shift, and the result of superposing these two light beams in a Fresnel zone, as known is the art. FIG. 2B is a graphical illustration of two coherent light beams of equal frequency but phase shift difference of 180 degrees, and the result of superposing these two light beams in a Fresnel zone, as known is the art. FIG. 2C is a graphical illustration of two coherent light beams of equal frequency and an arbitrary phase shift difference, and the result of superposing these two light beams in a Fresnel zone, as known is the art.

The intensities of light beams 7 and 9 are substantially equal. Resultant interference light beam 13 is composed of the super-position of light beam 7 with light beam 9. If both light beams 7 and 9 are of the same phase shift, namely—the phase shift difference is zero, then the resultant light beam 13 will be similar in its coherence and phase shift to light beams 7 and 9. However, the amplitude of the electromagnetic field measured by the screen in the central Fresnel zone will be substantially equal to twice the amplitude of the electromagnetic field of each light beam, as illustrated in FIG. 2A.

Thus, the intensity measured will be equal to four times the intensity of each incident light beam (the intensity is proportional to the amplitude, squared). If the phase shift difference between the two light beams 7 and 9 is half a cycle, commonly termed as 'π' in units of radian, wherein 2π radians define a complete cycle, then the intensity measured by the screen is zero. This phenomenon is known as destructive interference, as illustrated in FIG. 2B. Other phase shift differences will provide intermediate resultant intensities, e.g., π/2 phase shift difference will yield a measurement with intensity approximately equal to 2 times the intensity of each light beam 7 or 9, as is illustrated in FIG. 2C.

To achieve the above described Fresnel Zone effect, a uniform polarization and frequency coherent light should be applied with known phase shift difference at inlets 1 and 3. If the phase shift difference is zero, a bright central Fresnel Zone will appear on screen 15 (confer FIG. 2A). If the phase difference is π, a dark central zone will appear on screen 15 (FIG. 2B). In general, if the wave functions $\psi_1$ and $\psi_2$, representing light beams 7 and 9, respectively, are given by:

$$\psi_1 = A_1 \cdot \cos(\omega t + \psi_1) \text{ and } \psi_2 = A_2 \cdot \cos(\omega t + \psi_2) \quad (1)$$

wherein for i=1, 2, $A_i$ is a constant representing the amplitude, and $\phi_i$ is the phase shift, then the resultant average wave function $\psi$ of the resultant light beam 13 measured at screen 15 is given by:

$$\psi = \sqrt{(\psi_1 + \psi_2)^2} = \sqrt{[A_1^2 + A_2^2 + 2A_1A_2 \cos(\phi_2 - \phi_1)]}. \quad (2)$$

If, for example, $A_1 = A_2$ and $\phi_2 - \phi_1 = \pi$, then:

$$\psi = \sqrt{[A_1^2 + A_1^2 + 2A_1^2 \cos(\phi_2 - \phi_1)]} \quad (3)$$

But $\cos(\phi_2 - \psi_1) = \cos(\pi) = (-1)$. Thus:

$$\psi = \sqrt{[A_1^2 + A_1^2 + 2A_1^2(-1)]} = 0. \quad (4)$$

This is equivalent to an "optical-minimum" at the central Fresnel Zone.

The generation of two such light beams with the same amplitude A and the same frequency ω, is possible, for example, by a single source that generates both light beams, and where the phase shift φ is provided by a suitable shifter that retains the frequency and shifts the phase. The use of fibers of different lengths by which the path length determines the number of wavelengths (or cycles) that pass there through, is one such simple shifter. The use of retarding material for the path of one of the light beams or the use of birefringent material that splits the light beams in different paths with different lengths, or retarding material properties are examples of other such shifters.

Device 100 of FIG. 1 can be readily applied as an optical analog of a logical transistor, i.e.: performing a logical function similar to logical electronic devices based on transistors, such as AND, OR, XOR, or NOR gates, disregarding amplification effects of transistors. For example, a destructive interference at outlet 5 may be considered as a binary 0 and a constructive interference as a binary 1 (or vice versa). Accordingly, device 100 may be referred to as an optical gate, junction or transistor. Device 100 can be installed by the hundreds, thousands and even more, in a single device to construct a multiple states system or a processor, in combinations similar to those typical of conventional electronic devices. The difference is the way in which the states are defined, which is optical rather than electrical.

The manufacture of a multiplicity of optical junctions like device 100 in a single processor is feasible, by using slices of tapes in which tracks are carved by employing nano-technological principles, or by the use of laser such as an ultra violet hot laser having a beam size of 1 nanometer, for carving a track or a path for the light in the substrate.

According to another aspect of the present invention, electronic signals are converted to optical signals before entering the processor of the present invention and the optical signals at the output of the processor are converted back to electronic signals. In this manner, it is possible to incorporate the processor of the present invention with conventional electronic elements, such as communication interface, input/output device, memory modules, network controller, and the like.

Figure 3:
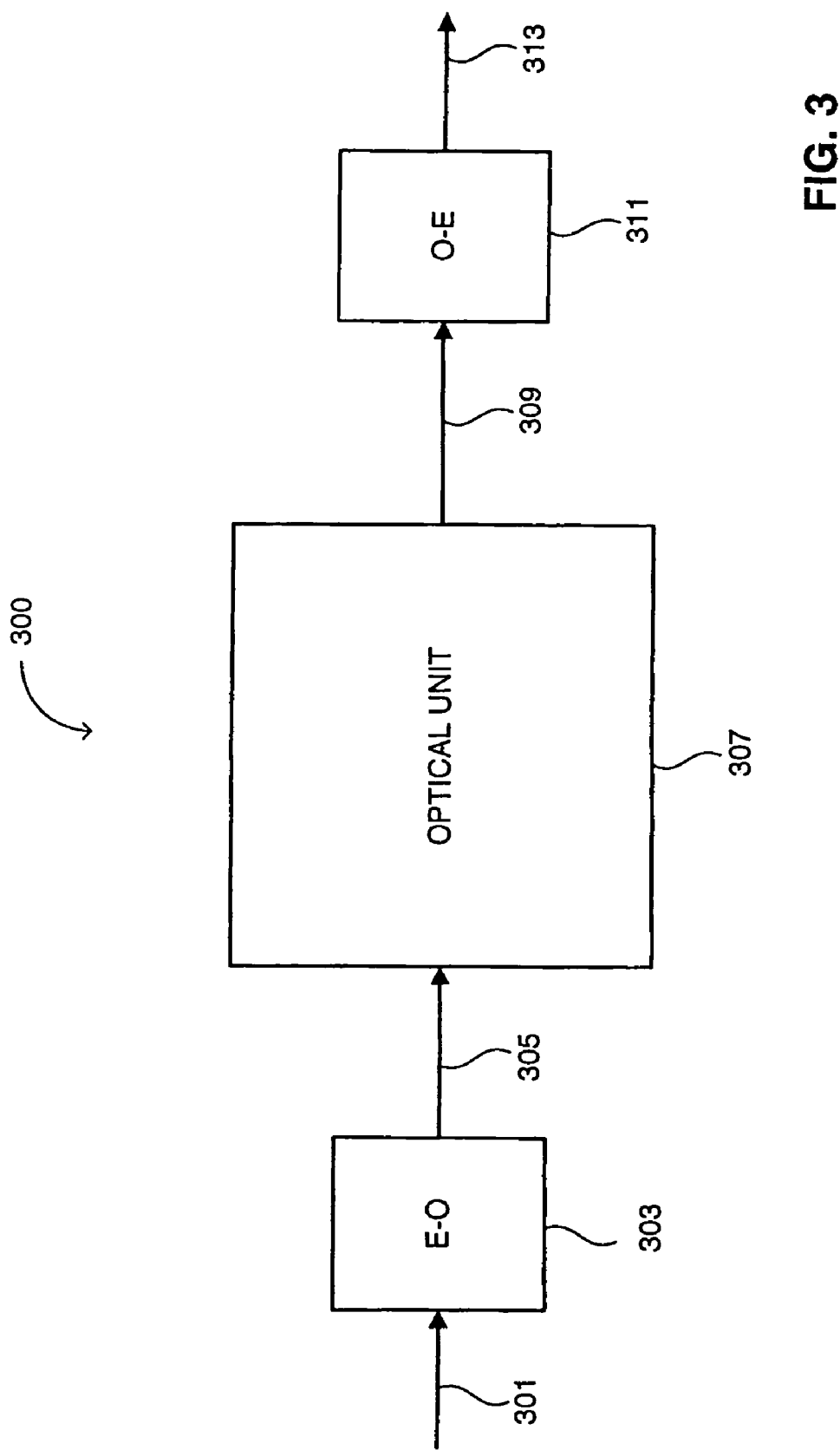
FIG. 3 is a schematic illustration of a system, constructed and operative in accordance with another preferred embodiment of the present invention.
Figure 4A:
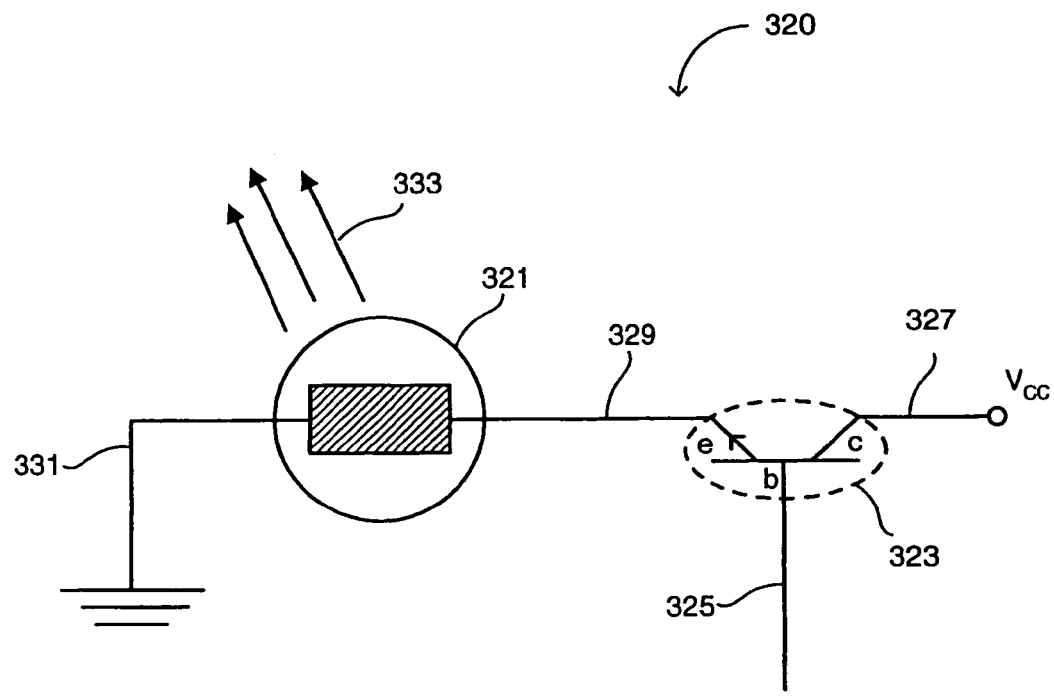
FIG. 4A is a schematic illustration of an electro-optic converter (EO), constructed and operative in accordance with a further preferred embodiment of the present invention.
Figure 4B:
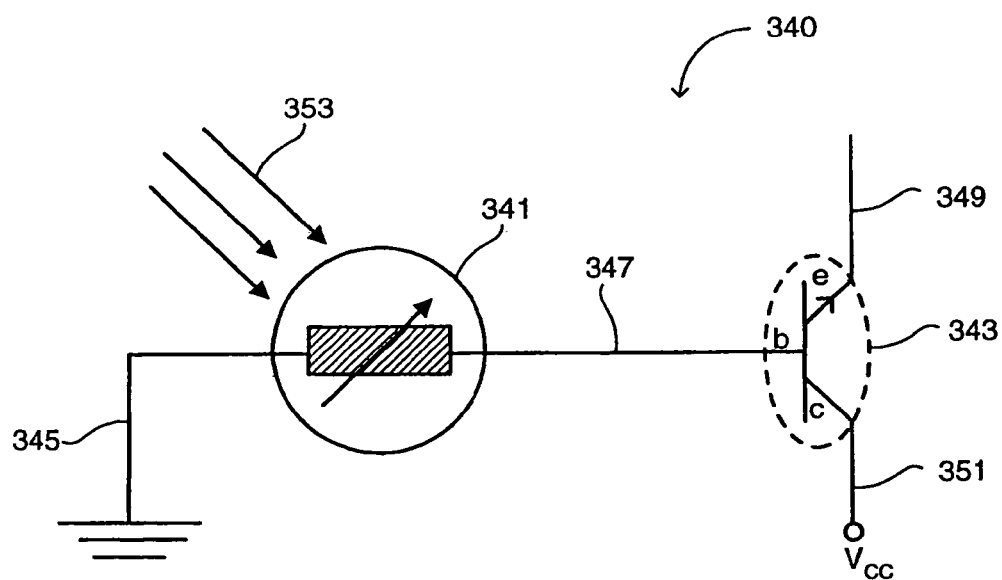
FIG. 4B is a schematic illustration of an opto-electric converter (OE), constructed and operative in accordance with another preferred embodiment of the present invention.

Reference is now made to FIGS. 3, 4A and 4B. FIG. 3 is a schematic illustration of a system, generally referenced 300, constructed and operative in accordance with a preferred embodiment of the present invention. FIG. 4A is a schematic illustration of an electro-optic converter (EO), generally referenced 320, constructed in accordance with another preferred embodiment of the present invention. FIG. 4B is a schematic illustration of an opto-electric converter (OE), generally referenced 340, constructed in accordance with a further preferred embodiment of the present invention.

With reference to FIG. 3, system 300 includes an electro-optic converter 303, an optical element 307 (which may include an optical gate or an optical processor), and an opto-electric converter 311. Optical element 307 is coupled to electro-optic converter 303 and to opto-electric converter 311. Optical element 307 includes one or more components similar to device 100 (FIG. 1). Examples of optical processors are further elaborated herein below with reference to FIGS. 5, 6 and 7.

An input electrical signal 301 enters electro-optic converter 303. Electro-optic converter 303 converts input electrical signal 301 into an input optical signal 305, and sends input optical signal 305 to optical element 307. Optical element 307 receives input optical signal 305, processes it, and sends an output optical signal 309 to opto-electric converter 311. Opto-electric converter 311 converts output optical signal 309 into an output electrical signal 313.

With reference to FIG. 4A, electro-optic converter 320 includes a transistor 323, conducting wires 325, 327, 329 and 331, and a light-emitting diode (LED) 321. A LED is an electrical element having the property, that a current flowing there through causes it to emit light at an intensity proportional to the current. Conducting wire 329 is coupled to LED 321 and to the emitter (e) of transistor 323. The collector (c) and base (b) of transistor 323 are coupled to conducting wires 327 and 325, respectively. LED 321 is further coupled to conducting wire 331. Conducting wire 331 is grounded (i.e., its potential is referenced zero). The potential at collector (c) of transistor 323 is $V_{cc}$. An electrical signal passes through conducting wire 325 and is received at the base (b) of transistor 323. The potential difference between the collector and the base of transistor 323 causes transistor 323 to amplify the signal and send the amplified signal through its emitter (e) to conducting wire 329. LED 321 receives the amplified signal from conducting wire 329. The current flowing through LED 321 causes it to emit an optical signal 333 proportional to the amplified electric signal.

With reference to FIG. 4B, opto-electric converter 340 includes a transistor 343, conducting wires 345, 347, 349 and 351, and a photodiode 341. A photodiode is an electrical element having the property, that the incoming light causes it to release electrons for conduction of electricity, wherein the number of electrons released for conduction is proportional to the intensity of the light. Hence, the resistance of photodiode 341 to electric current is inversely proportional to the intensity of the incoming light. Conducting wire 347 is coupled to photodiode 341 and to the base (b) of transistor 343. The collector (c) and emitter (e) of transistor 343 are coupled to conducting wires 351 and 349, respectively. Photodiode 341 is grounded through conducting wire 345. The potential at collector (c) of transistor 343 is $V_{cc}$. An optical signal 353 is received at photodiode 341, causing it to conduct electricity. The potential difference between the two sides of photodiode 341 produces a current (i.e., an electrical signal) proportional to the intensity of optical signal 353. Transistor 343 amplifies the electrical signal and sends the amplified signal to the emitter (e) of transistor 343.

It is noted that similar electro-optic and opto-electric converters can be used without the use of transistors. However, the use of transistors allows controlling the amplification of the electrical and optical signals. The use of converters such as the exemplary converters illustrated in FIGS. 4A and 4B enables the integration of a junction gate into electronic systems. However, it is apparent that a fully optical apparatus—in which all electrical transistors and processors are replaced by equivalent optical devices, reduces and may even eliminate entirely the necessity to use converters. A Personal Computer (PC), other computers, and appliances, or computer integrated apparatus, may be replaced by equivalent optical devices. In particular, for devices that already incorporate optical technologies, such as display monitors, optical communication and switching apparatus, the direct application of the present invention without conversion is apparent.

According to another aspect of the present invention, an optical processor is constructed by interconnecting a plurality of optical gates. Incoming light beams enter the optical processor at one end thereof, the optical gates process the incoming light beams and a plurality of outgoing light beams exit the optical processor. A plurality of detectors detects the outgoing light beams, thereby providing the result of the processing procedure.

Figure 5:
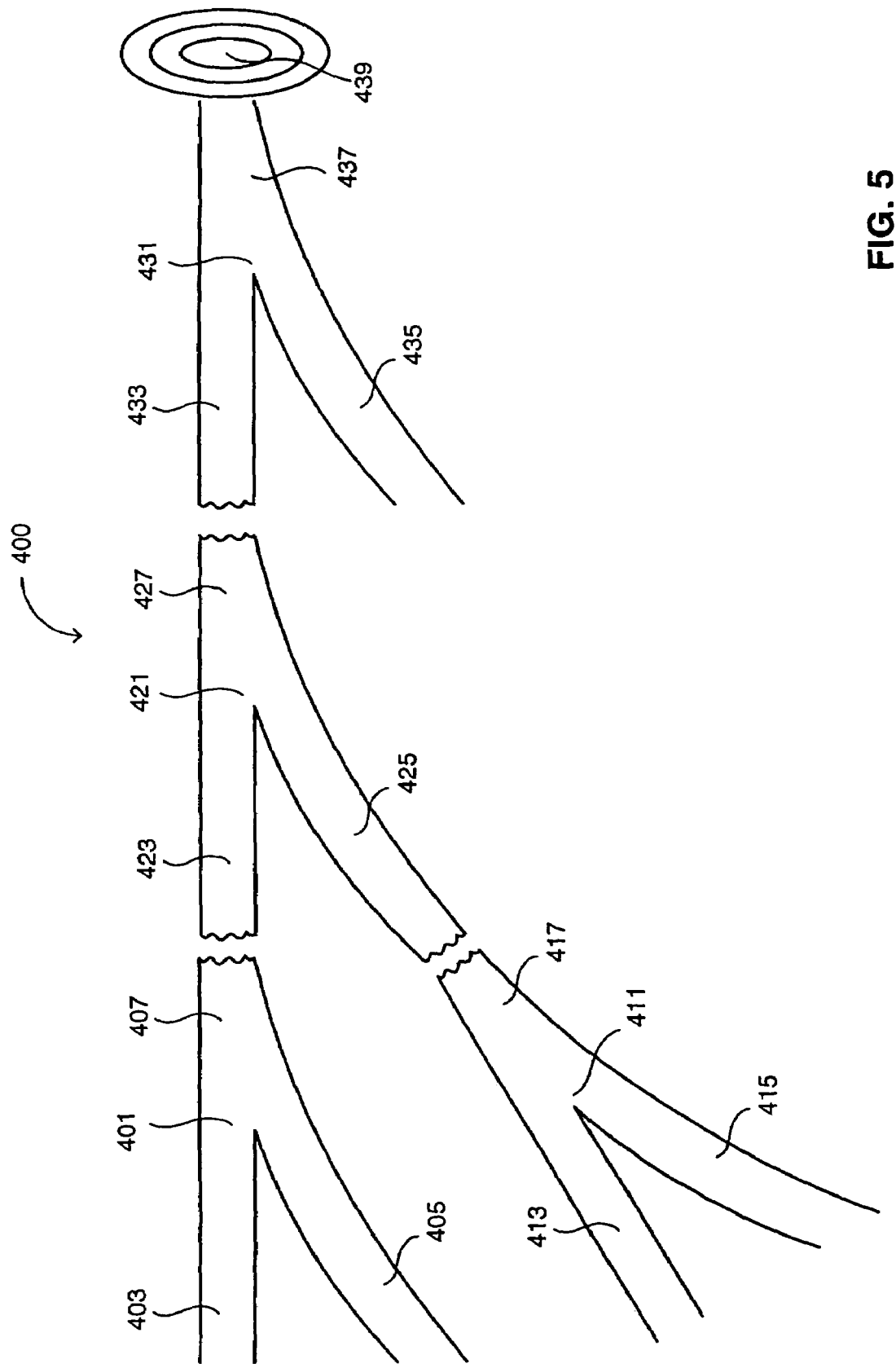
FIG. 5 is a schematic illustration of a system using a plurality of junction gates, constructed and operative in accordance with a further preferred embodiment of the present invention.
Figure 6:
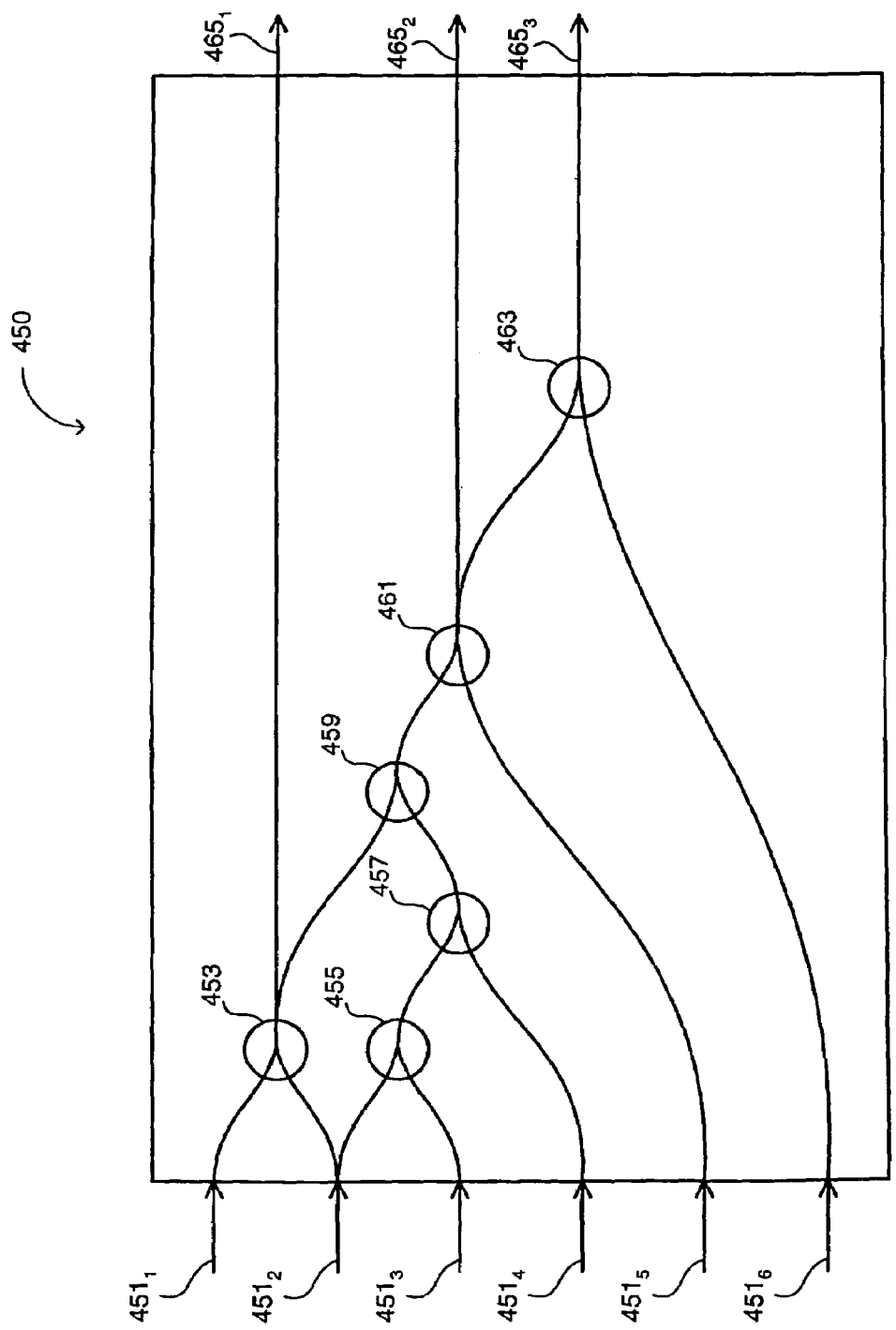
FIG. 6 is a schematic illustration of an optical processor constructed and operative in accordance with another preferred embodiment of the present invention.
Figure 7:
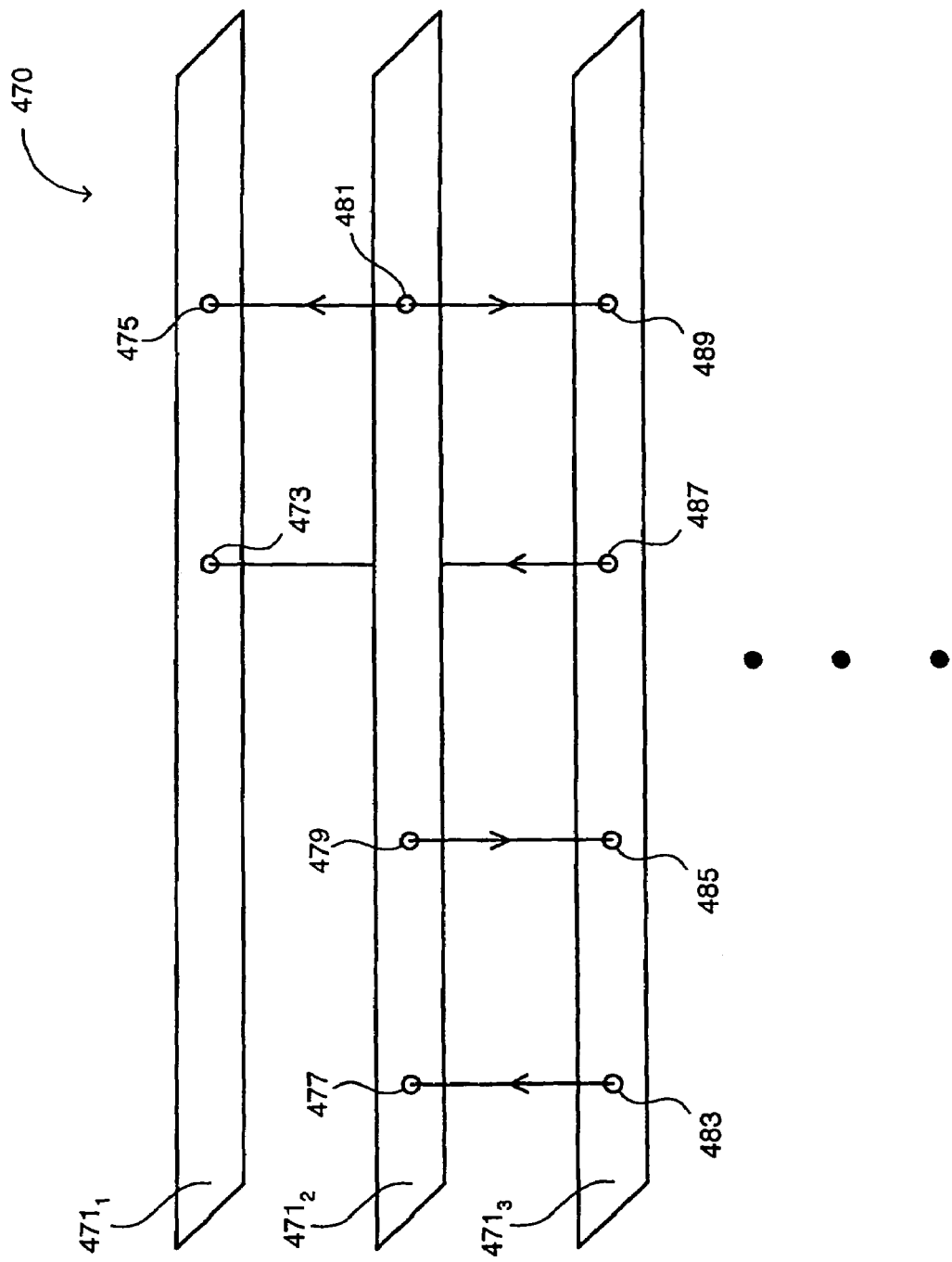
FIG. 7 is a schematic illustration of a three-dimensional optical processor constructed and operative in accordance with a further preferred embodiment of the present invention.

Reference is now made to FIGS. 5, 6 and 7. FIG. 5 is a schematic illustration of a system, generally referenced 400, using a plurality of junction gates, constructed and operative in accordance with a preferred embodiment of the present invention. FIG. 6 is a schematic illustration of an optical processor, generally referenced 450, constructed and operative in accordance with another preferred embodiment of the present invention. FIG. 7 is a schematic illustration of a three-dimensional optical processor, generally referenced 470, constructed and operative in accordance with a further preferred embodiment of the present invention.

With reference to FIG. 5, system 400 includes junction devices 401, 411, 421 and 431, and a screen 439. Device 401 includes inlets 403 and 405 and an outlet 407. Device 411 includes inlets 413 and 415 and an outlet 417. Device 421 includes inlets 423 and 425 and an outlet 427. Device 431 includes inlets 433 and 435 and an outlet 437. Outlet 407 of device 401 is coupled to inlet 423 of device 421. Outlet 417 of device 411 is coupled to inlet 425 of device 421. Outlet 427 of device 421 is coupled to inlet 433 of device 431. Outlet 437 of device 431 is coupled to screen 439. System 400 illustrates the incorporation of a plurality of devices in an optical circuit. The output light beam in outlet 437 of device 431 is the superposition of the input light beams in inlets 403, 405, 413, 415 and 435. Thus, the signal which exits outlet 437 and enters screen 439 is a function of the signals which enter inlets 403, 405, 413, 415 and 435. Accordingly, system 400 can represent a logical function with multiple inputs and a single output.

With reference to FIG. 6, processor 450 includes processor inlets $451_1$, $451_2$, $451_3$, $451_4$, $451_5$ and $451_6$, junction gates 453, 455, 457, 459, 461 and 463, and processor outlets $465_1$, $465_2$ and $465_3$. Each of the junction gates 453, 455, 457, 459, 461 and 463, includes two gate inlets and one gate outlet. Some of the inlets and outlets of processor 450 and of the junction gates 453, 455, 457, 459, 461 and 463, are interconnected by conveying media such as optical fibers, and the like. Processor inlet 451 is coupled to the first inlet of junction gate 453. Processor inlet 451$_2$ is coupled to the second inlet of junction gate 453 and to the first inlet of junction gate 455. Processor inlet 451$_3$ is coupled to the second inlet of junction gate 455. Processor inlet 451$_4$ is coupled to the second inlet of junction gate 457. Processor inlet 451$_5$ is coupled to the second inlet of junction gate 461. Processor inlet 451$_6$ is coupled to the second inlet of junction gate 463. The outlet of junction gate 453 is coupled to processor outlet 465$_1$ and to the first inlet of junction gate 459. The outlet of junction gate 455 is coupled to the first inlet of junction gate 457. The outlet of junction gate 457 is coupled to the second inlet of junction gate 459. The outlet of junction gate 459 is coupled to the first inlet of junction gate 461. The outlet of junction gate 461 is coupled to processor outlet 465$_2$ and to the first inlet of junction gate 463. The outlet of junction gate 463 is coupled to processor outlet 465$_3$. Optical processor 450 receives up to six optical signals at processor inlets 451$_1$, 451$_2$, 451$_3$, 451$_4$, 451$_5$ and 451$_6$. The optical signals pass through some of the junction gates in processor 450, according to the couplings described hereinabove, and are superposed accordingly. The processed signals are sent through processor outlets 465$_1$, 465$_2$ and 465$_3$. The signals at processor outlets 465$_1$, 465$_2$ and 465$_3$ depend on the intensities and the phase shifts of the signals which enter processor inlets 451$_1$, 451$_2$, 451$_3$, 451$_4$, 451$_5$ and 451$_6$.

With reference to FIG. 7, three-dimensional processor 470 includes top layer 471$_1$, middle layer 471$_2$ and bottom layer 471$_3$. Each of the top layer 471$_1$, middle layer 471$_2$ and bottom layer 471$_3$ is similar to optical processor 450 (FIG. 6), although the configuration of the gates thereof and the interconnections between the gates, is not restricted to the example illustrated in FIG. 6. Top layer 471$_1$ includes contact points 473 and 475. Middle layer 471$_2$ includes contact points 477, 479 and 481. Bottom layer 471$_3$ includes contact points 483, 485, 487 and 489. Three-dimensional processor 470 may further include additional layers below bottom layer 471$_3$ (denoted by dots below bottom layer 471$_3$) or above top layer 471$_1$. Some of the contact points of the different layers are interconnected by conveying media such as optical fibers, and the like. Contact point 477 is coupled to contact point 483. Contact point 479 is coupled to contact point 485. Contact point 473 is coupled to contact point 487. Contact point 481 is coupled to contact point 475 and to contact point 489. The arrows on the connection lines in FIG. 7 illustrate a possible direction of flow of light. According to the example set forth in FIG. 7, light flows from contact points 483, 479 and 487 to contact points 477, 485 and 473, respectively, and from contact point 481 to contact points 475 and 489. It is noted, however, that the same three-dimensional processor can be used with different directions of flow.

According to another aspect of the present invention, an optical system includes a plurality of inlets and an outlet. Incoming light beams enter the optical system through each of the inlets, and an outgoing light beam which is a superposition of the incoming light beams exits through the outlet of the optical system. A detector located at the outlet, detects the outgoing light beam and produces a logical signal according to the properties of the outgoing light beam.

Figure 8:
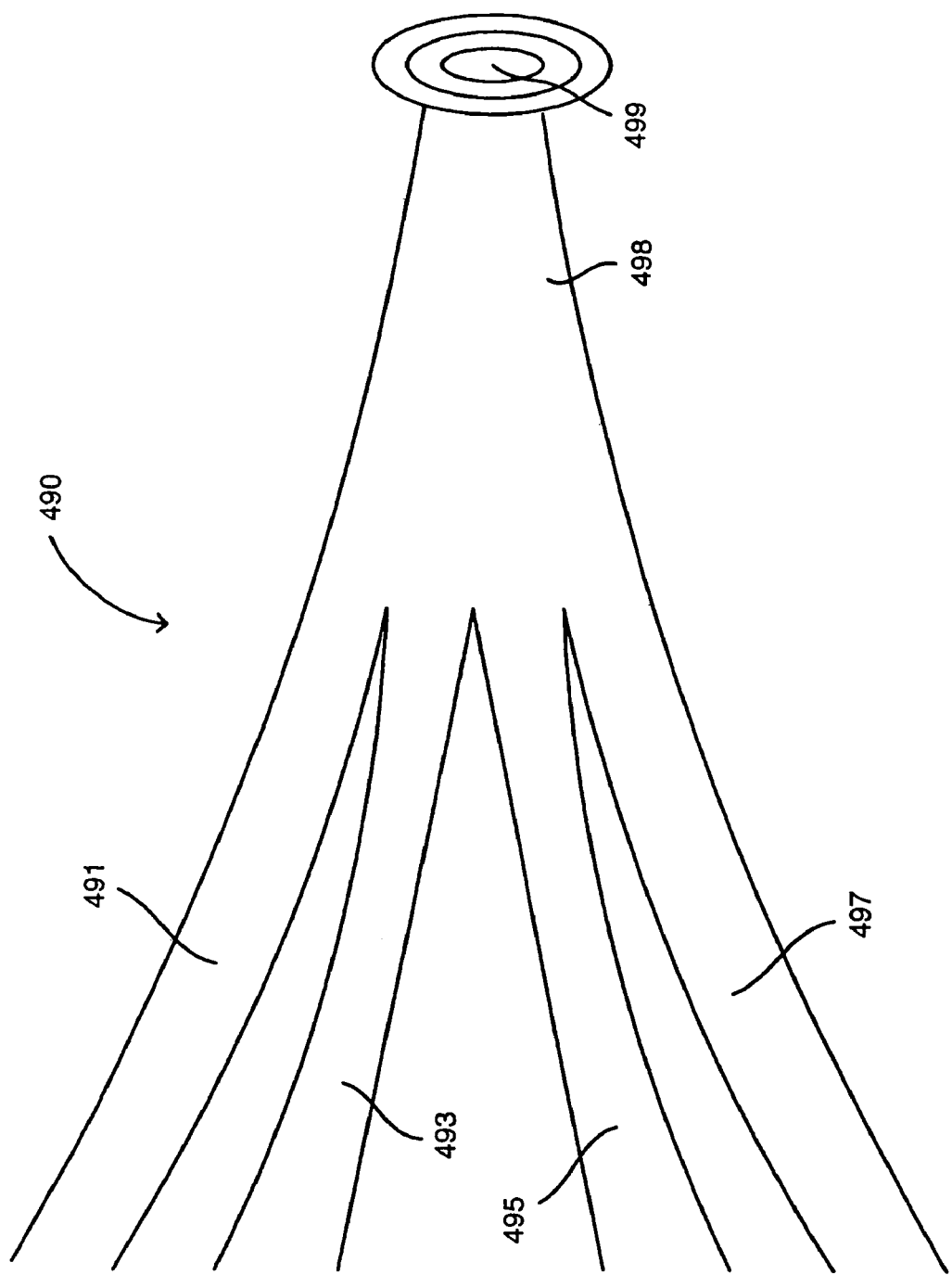
FIG. 8 is a schematic illustration of a system constructed and operative in accordance with another preferred embodiment of the present invention.

Reference is now made to FIG. 8, which is a schematic illustration of a system, generally referenced 490, constructed and operative in accordance with a further preferred embodiment of the present invention. System 490 includes a first inlet 491, a second inlet 493, a third inlet 495, a fourth inlet 497, and an outlet 498. System 490 operates in a manner similar to system 100 (FIG. 1), except that system 490 has four inlets rather than two. The light beams which enter inlets 491, 493, 495 and 497 are superimposed at outlet 498. A measuring device such as screen 499 may be connected to outlet 498, directly or indirectly, whereby the superimposed light beam at outlet 498 eventually strikes screen 499. The measurement by screen 499 at the central Fresnel zone depends on the intensities and the relative phase-shift of the light beams which enter inlets 491, 493, 495 and 497. For example, if the light beams are of the same polarization, frequency, amplitude and phase shift (i.e. the phase shift difference among all the light beams is zero), then the amplitude of the superimposed light beam measured by screen 499 at outlet 498, is four times the amplitude of the light beam at each of the inlets 491, 493, 495 and 497. Furthermore, the intensity measured by screen 499 at outlet 498, is sixteen times the intensity of the light beam at each of the inlets 491, 493, 495 and 497 (i.e., the total intensity equals accumulation of four "amplitudes", all squared). If, however, two of the light beams are out-of-phase compared to the other two ($\pi$ phase shift difference), then the measured intensity is zero. If three of the light beams are in phase but one of the light beams is "zero" (i.e., the beam has zero intensity or it is composed of two equal components in antiphase), then the resulting amplitude is 3 times the amplitudes of the incoming light beams and the intensity at the outlet is 9 times their intensities. Moreover, if the amplitude of a light beam at an inlet is different from the amplitude of other light beams at other inlets, then the amplitude of the light beam at the outlet is substantially equal to the sum or the difference between the amplitudes of these two light beams, if these two light beams are in-phase or out-of-phase, respectively. System 490 can be used to perform non-Boolean operations. For example, if screen 499 (or other measuring device) distinguishes between different values of a measured intensity, then system 490 can be used as an adding machine for adding together four numbers. If screen 499 does not distinguish between different values of the measured intensity, then the non-Boolean results (i.e., values of the amplitude which may take on more than two different values) can still be used in intermediate processing procedures. For example, system 490 can be used for determining whether the sum of a plurality of input numbers exceeds a certain threshold. System 490 may also be used as a Boolean logic gate, which is relatively simple to implement in comparison to devices prevalent in conventional electronics. For example, the intensities, frequencies and polarizations of the input light beams are substantially equal, and the light beams are in phase (or in antiphase with each other). Furthermore, screen 499 does not distinguish between different levels of intensities, and the threshold for distinguishing between "one" and "zero" is 10 times the input light beam intensities. In this case, the result will be a Boolean "one" only if the four light beams are in phase. Thus, system 490 can be used as a Boolean AND gate with four input channels. Non-Boolean algebra may be employed with system 490 as well as with analogous systems having a different, N number, of input channels, as long as the output light beam contains N different modes that can be detected by screen 499.

According to another aspect of the present invention, there is thus provided a method and a system for performing multiple logical or switching actions in parallel. This aspect applies with further significance to parallel processing in a single processor. For the sake of simplifying this example, a processor is considered a device which includes a plurality of simple optical gates or junctions, such as those described herein above in connection with FIGS. 1 and 8. This allows increasing the power of an optical gate, junction or a processor, thereby allowing manifold increase in computation power.

Figure 9:
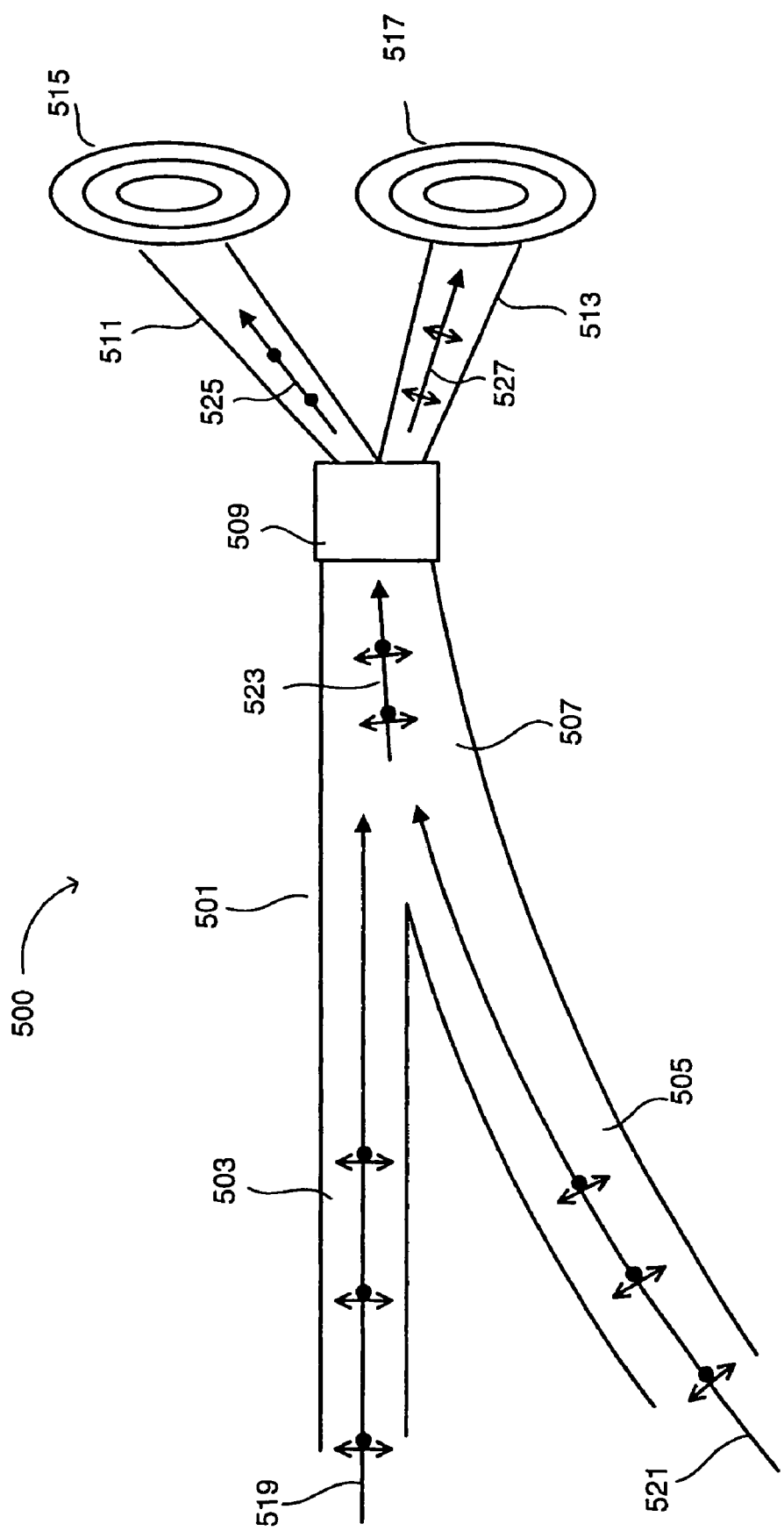
FIG. 9 is a schematic illustration of a system for performing parallel processing with different polarizations, constructed and operative in accordance with a further preferred embodiment of the present invention.
Figure 10A:
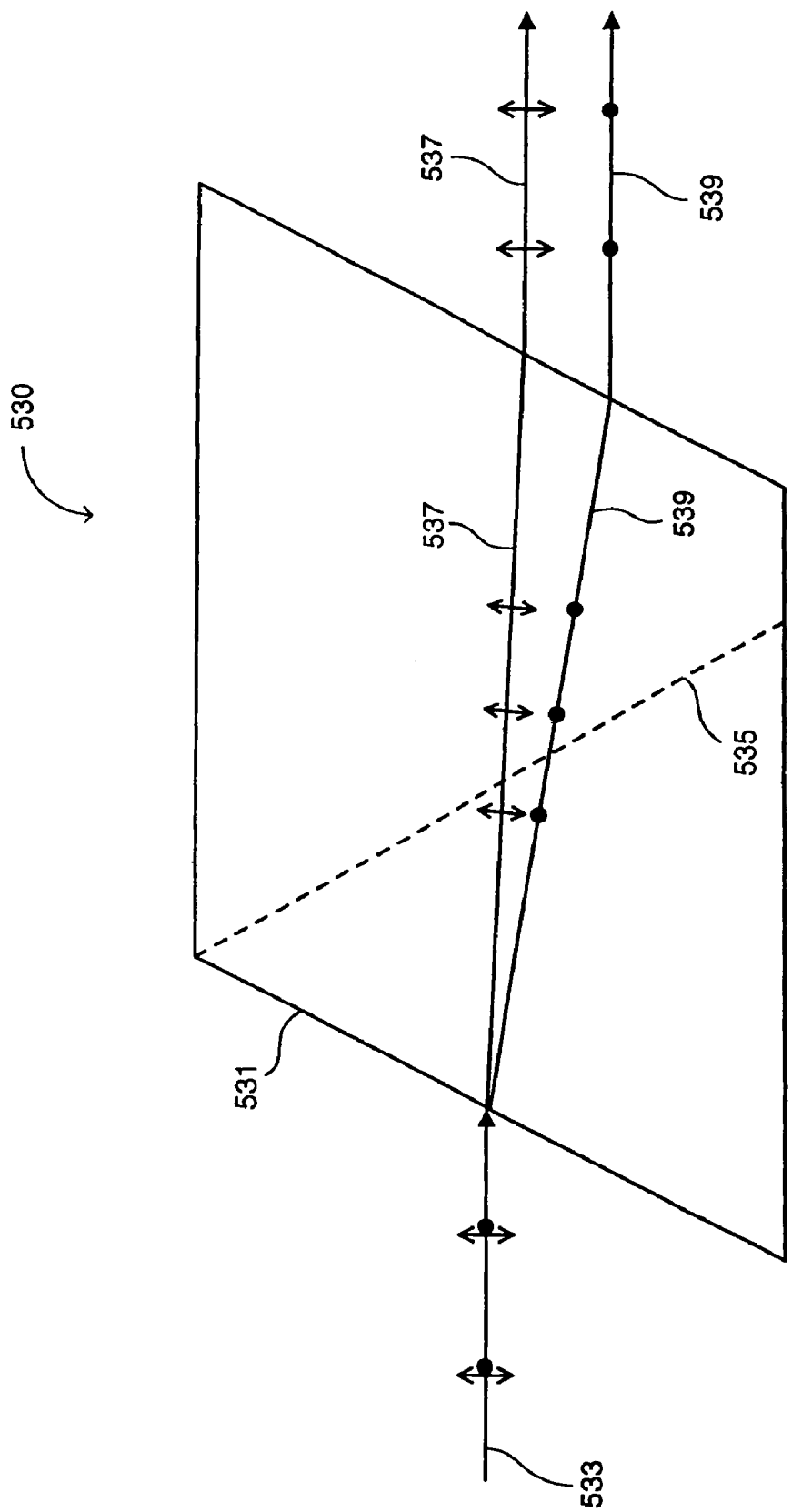
FIG. 10A is a schematic illustration of a polarization separator, which may be used for the polarization separator of FIG. 9, constructed and operative in accordance with another preferred embodiment of the present invention.
Figure 10B:
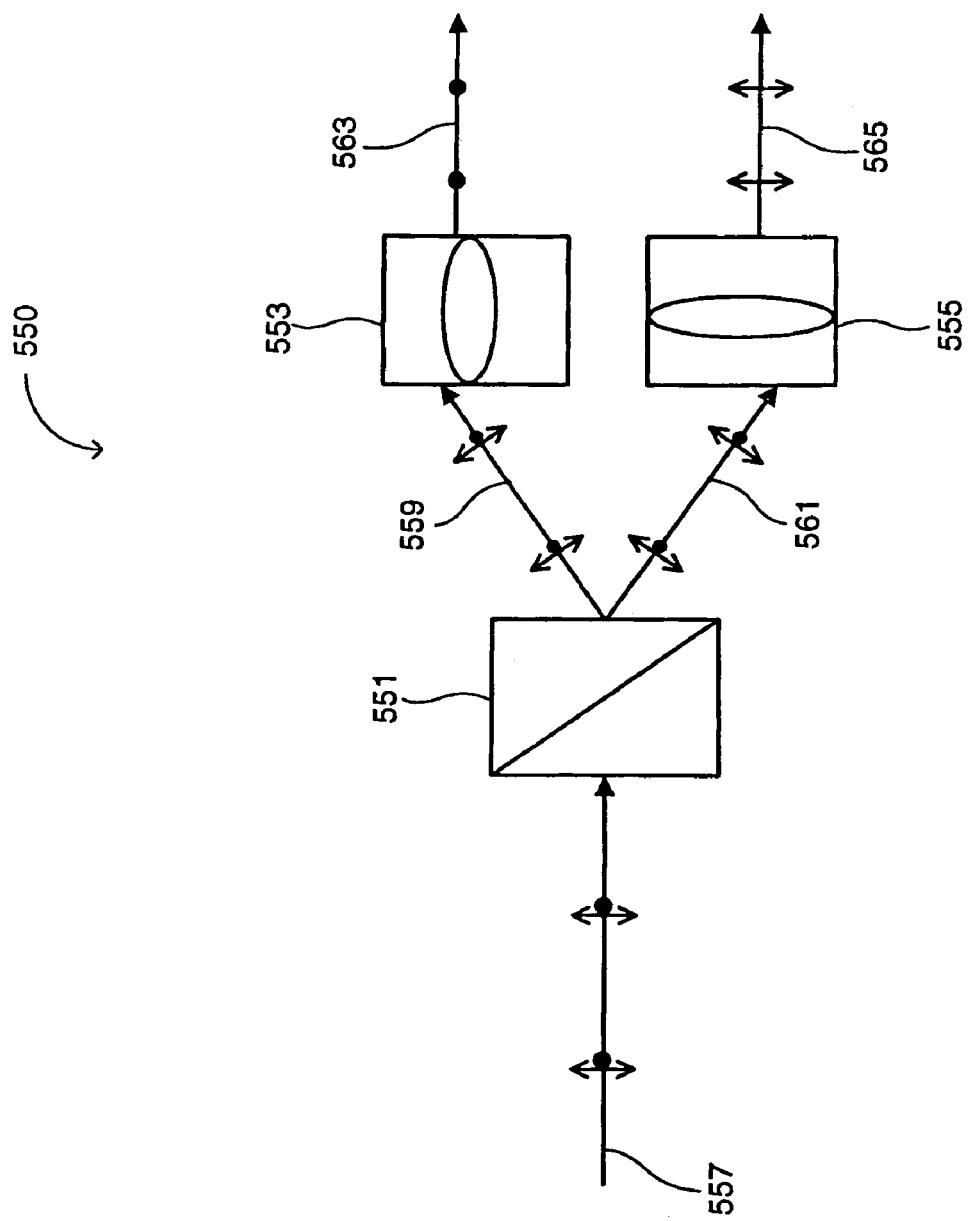
FIG. 10B is a schematic illustration of a polarization separator, which may be used as a preferable embodiment for the separator of FIG. 9, constructed and operative in accordance with a further preferred embodiment of the present invention.

One example of this aspect of the invention, concerns an alternative parallel-use technique that involves different polarizations with the same junction gate or processor. Two light beams which are linearly polarized in orthogonal directions can be used in the same junction gate without interfering with each other. In the description that follows, light which is linearly polarized in the plane of the drawing shall be referred to as vertically polarized light, and light which is linearly polarized perpendicular to the plane of the page shall be referred to as horizontally polarized light. In FIGS. 9, 10A and 10B, described herein below, dots indicate horizontally polarized light and arrows indicate vertically polarized light.

According to another aspect of the present invention, a polarization separator is coupled to the outlet of a junction gate. The polarization separator emits two outgoing light beams of two different polarizations, when two incoming light beams each polarized at both of these polarizations, enter the junction gate through each of the two inlets of the junction gate.

Reference is now made to FIG. 9, which is a schematic illustration of a system, generally referenced 500, for performing parallel processing with different polarizations, constructed and operative in accordance with a preferred embodiment of the present invention. System 500 includes a junction gate 501, a polarization separator 509, a first output channel 511, and a second output channel 513. A first screen 515 and a second screen 517 represent intensity measuring devices for performing logical operations, in analogy to screen 15 of FIG. 1. Junction gate 501 includes a first gate inlet 503, a second gate inlet 505, and a gate outlet 507. Polarization separator 509 is coupled to gate outlet 507 and to output channels 511 and 513. Output channels 511 and 513 are coupled to screens 515 and 517, respectively. Incoming light beams 519 and 521 simultaneously enter gate inlets 503 and 505, respectively. Light beams 519 and 521 are each composed of two orthogonal polarization direction represented by a "horizontally" polarized component and a "vertically" polarized component. Light beams 519 and 521 are superimposed in gate outlet 507 to produce an interference light beam 523. Interference light beam 523 enters gate 507 as input to polarization separator 509. Polarization separator 509 separates the components of the interference light beam 523, whose polarizations are orthogonal. Accordingly, polarization separator 509 sends a horizontally polarized light beam 525 to first output channel 511, and a vertically polarized light beam 527 to second output channel 513. Light beams 525 and 527 are received at screens 515 and 517, respectively for performing logical operation in analogy to operations described with reference to FIG. 1. Thus, the horizontally polarized signals and the vertically polarized signals are each processed without interfering with each other. It will be noted that a multiplicity of gate inlets may be employed, such as in analogy to the four gates described in reference to FIG. 8, and that the embodiment illustrated in FIG. 9 is reduced to two gate inlets 503 and 505 for the sake of simplicity of description.

Reference is now made to FIG. 10A, which is a schematic illustration of a polarization separator, generally referenced 530, constructed and operative in accordance with a further preferred embodiment of the present invention. Polarization separator 530 may be used for polarization separator 509 in FIG. 9. Polarization separator 530 includes a birefringent material 531. An incoming light beam 533 is received at one side of birefringent material 531. The plane of incidence of light beam 533 lies on the plane of the drawing. The optical axis 535 of birefringent material 531 also lies on the plane of the drawing. Light-beam 533 is composed of horizontally and vertically polarized components. Due to the difference in the index of refraction of birefringent material 531 for horizontally and vertically polarized light, light beam 533 is split in birefringent material 531 into a first light beam 537 containing the vertically polarized component of light beam 531 in the plane of the drawing (also known as the "e"-ray), and a second light beam 539 containing the horizontally polarized component of light beam 531 in perpendicular to the plane of the drawing (also known as the "o"-ray). Light beams 537 and 539 travel in slightly different directions in birefringent material 531, and exit birefringent material 531 at different locations. This phenomenon is known as double refraction. With reference to FIG. 9, system 530 directs light beams 537 and 539 (referenced 527 and 525 in FIG. 9) to output channels 511 and 513, respectively. Thus, the horizontally and vertically polarized components of light beam 533 (referenced 523 in FIG. 9) are separated and can be processed separately.

According to another aspect of the present invention, two polarizers whose orientation of polarization is substantially 90 degrees apart, receive light beams from a beam splitter. Each polarizer emits an outgoing light beam in a single plane of polarization and filtering other polarizations, when an incoming light beam polarized at two different polarizations (or more polarizations), enters the beam splitter. Two such polarizers for selectively directing polarized light at a first plane and directing another polarized light at another plane normal to the first plane, may be employed in different times or locations to provide two polarized beams of light at two different polarizations.

Reference is now made to FIG. 10B, which is a schematic illustration of a polarization separator, generally referenced 550, constructed and operative in accordance with yet another preferred embodiment of the present invention. Polarization separator 550 may be used for polarization separator 509 in FIG. 9. Polarization separator 550 includes a beam splitter 551, a first polarizer 553 and a second polarizer 555. An incoming light beam 557 is received at beam splitter 551. Incoming light beam 557 is composed of horizontally polarized components and vertically polarized components. Beam splitter 551 splits incoming light beam 557 into a first light beam 559 and a second light beam 561. The characteristics of light beams 559 and 561 is substantially the same as the characteristics of incoming light beam 557, however the intensities of light beams 559 and 561 are less than the intensity of incoming light beam 557. This is so, because the sum of the intensities of light beams 559 and 561 is substantially equal to the intensity of incoming light beam 557. Beam splitter 551 directs light beams 559 and 561 to first polarizer 553 and to second polarizer 555, respectively. The orientation of polarization of first polarizer 553 is substantially the same as the orientation of the horizontal component of incoming light beam 557. The orientation of polarization of second polarizer 555 is substantially the same as the orientation of the vertical component of incoming light beam 557. Thus, first polarizer 553 blocks the vertical component of incoming light beam 557 and second polarizer 555 blocks the horizontal component of incoming light beam 557. A light beam 563 which exits first polarizer 553 is polarized with the horizontal component of incoming light beam 557 and a light beam 565 which exits second polarizer 555 is polarized with the vertical component of incoming light beam 557.

With reference also to FIG. 9, polarization separator 550 directs light beams 563 and 565 (referenced 525 and 527 in FIG. 9) to output channels 511 and 515, respectively. Thus, the horizontally and vertically polarized components of light beam 557 (referenced 523 in FIG. 9) are separated and may be processed separately. It is noted that polarization separator 550 reduces the intensity of each polarized component. Alternatively, a light beam of different wavelengths can be separated to different light beams, each at one of these wavelengths. This concept facilitates the use of a processor for parallel operations. The wavelengths can be sufficiently spaced apart, in order to avoid interference there between, thus allowing simultaneous use of the same medium for multiple switching or processing.

According to another aspect of the present invention, a wavelength separator is coupled to the outlet of an optical device, such as a junction, a gate or other optical element as shown with reference to FIGS. 1, 3, 5–8, and the like. The wavelength separator emits a plurality of outgoing light beams at different wavelengths, when two (or more) incoming light beams, each composed of a plurality of wavelengths, enter the optical element through the inlets thereof.

Figure 11:
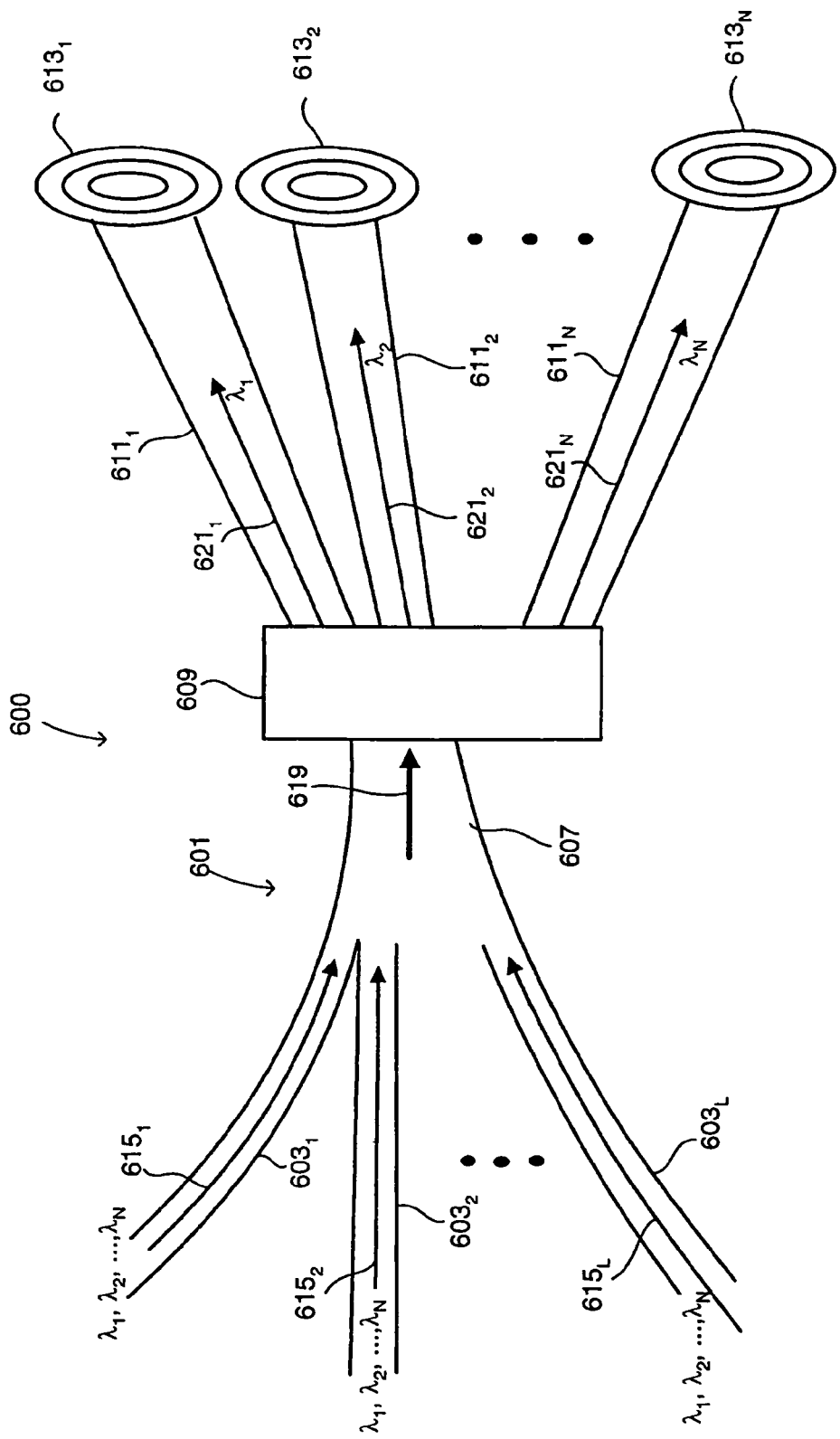
FIG. 11 is a schematic illustration of a system for performing parallel processing with different wavelengths, constructed and operative in accordance with another preferred embodiment of the present invention.

Reference is now made to FIG. 11, which is a schematic illustration of a system, generally referenced 600, for performing parallel processing with different wavelengths constructed and operative in accordance with another aspect of the present invention. System 600 includes a junction gate 601, a wavelength separator 609, a plurality of N output channels $611_1$, $611_2$ and $611_N$. Junction gate 601 includes a plurality of L inlets $603_1$, $603_2$ and $603_L$ and an outlet 607. A plurality of screens $613_1$, $613_2$, and $613_N$ or other measuring devices are associated to output channels $611_1$, $611_2$ and $611_N$, respectively. Wavelength separator 609 is coupled to outlet 607 and to output channels $611_1$, $611_2$ and $611_N$. Incoming light beams $615_1$, $615_2$ and $615_L$ simultaneously enter inlets $603_1$, $603_2$ and $603_L$, respectively. Incoming light beams $615_1$, $615_2$ and $615_L$ are each composed of a plurality of N components at wavelengths $\lambda_1$, $\lambda_2$ and $\lambda_N$. It is noted that "L" and "N" may be any natural numbers and that correlation between N and L is call for. It is further noted that the phase shift or the intensity of a component of incoming light beam $615_i$ (i=1, 2, ..., L) at one wavelength $\lambda_j$ (j=1, 2, ..., N), is not necessarily equal to the phase shift and the intensity of another component of the same incoming light beam $615_i$, at a different wavelength $\lambda_k$ (k=1, 2, ..., N). However, all components of the same wavelength $\lambda_j$ (j=1, 2, ..., N) in all incoming beams $615_1$, $615_2$ until $615_L$ substantially have the same intensities and phase or antiphase shifts as required in a single frequency embodiments such as of FIG. 1 or FIG. 8. A resultant superposed light beam 619 is produced at outlet 607. Superposedlight beam 619 is the superposition of incoming light beams $615_1$, $615_2$ and $615_L$. Hence, superposedlight beam 619 is composed of components at wavelengths $\lambda_1$, $\lambda_2$ and $\lambda_N$. Superposedlight beam 619 enters wavelength separator 609. Wavelength separator 609 separates superposed light beam 619 to outgoing light beams $621_1$, $621_2$ and $621_N$, at wavelengths $\lambda_1$, $\lambda_2$ and $\lambda_N$, respectively. An outgoing light beam $621_i$ (i=1, 2, ..., N) groups together components of the same corresponding wavelength $\lambda_i$, which components originate from all the incoming light beams $615_1$, $615_2$ and $615_L$. In agreements with the terminology herein, all the L components with the same wavelength $\lambda_i$ are said to belong to the same group "i" of light beams. Wavelength separator 609 directs outgoing light beams $621_1$, $621_2$ and $621_N$ to output channels $611_1$, $611_2$ and $611_N$, respectively. Screens $613_1$, $613_2$ and $613_N$ receive light beams $621_1$, $621_2$ and $621_N$, respectively, from output channels $611_1$, $611_2$ and $611_N$, respectively. Screens $613_1$, $613_2$ and $613_N$ can detect the properties of light beams $621_1$, $621_2$ and $621_N$, namely—amplitudes and phase shifts, in analogy to the description in reference to FIG. 1. It is noted that separation of wavelengths facilitates parallel processing, without interaction among the different-wavelength components. This is subject to transfer of energy or "quark" from "hot" photons to "cold" photons which can distort the signal (for example, infra red laser is 3 degrees Kelvin hotter than Na laser). No signal distortion is expected to occur at similar wavelengths. Examples of wavelength separators include prisms, splitters, filters, and the like.

Figure 12A:
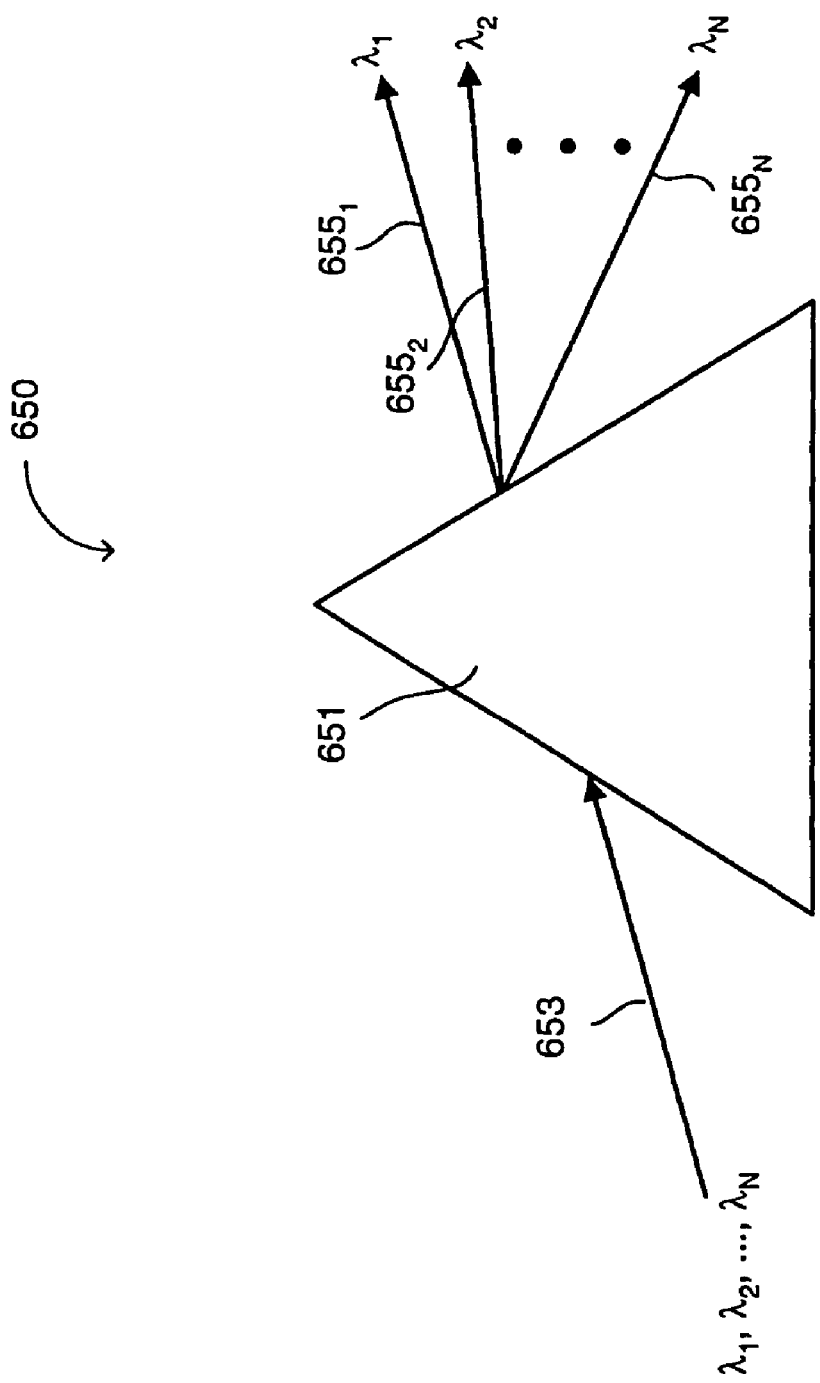
FIG. 12A is a schematic illustration of a wavelength separator, which may be used as a preferable embodiment for the separator of FIG. 11, constructed and operative in accordance with a further preferred embodiment of the present invention.

Reference is now made to FIG. 12A, which is a schematic illustration of a wavelength separator, generally referenced 650, constructed and operative in accordance with a further preferred embodiment of the present invention. Wavelength separator 650 may be used as a preferable embodiment for separator 609 in FIG. 11. Wavelength separator 650 includes a dispersive prism 651. An incoming light beam 653 composed of a plurality of components at wavelengths $\lambda_1$, $\lambda_2$ and $\lambda_N$, enters dispersive prism 651. Due to dispersion of the light wave in dispersive prism 651, different components of incoming light beam 653 travel at different speeds within dispersive prism 651. Hence, different components of incoming light beam 653 at different wavelengths, exit dispersive prism 651 in different directions. Thus, dispersive prism 651 splits oncoming light beam 653 to a plurality of outgoing light beams $655_1$, $655_2$, and $655_N$. Outgoing light beams $655_1$, $655_2$, and $655_N$ are at wavelengths of $\lambda_1$, $\lambda_2$ and $\lambda_N$, respectively.

According to another aspect of the present invention, a plurality of different wavelength filters receives light beams from a beam splitter. Each wavelength filter emits an outgoing light beam at a specific wavelength and blocks other wavelengths, when an incoming light beam composed of different wavelengths enters the beam splitter.

Figure 12B:
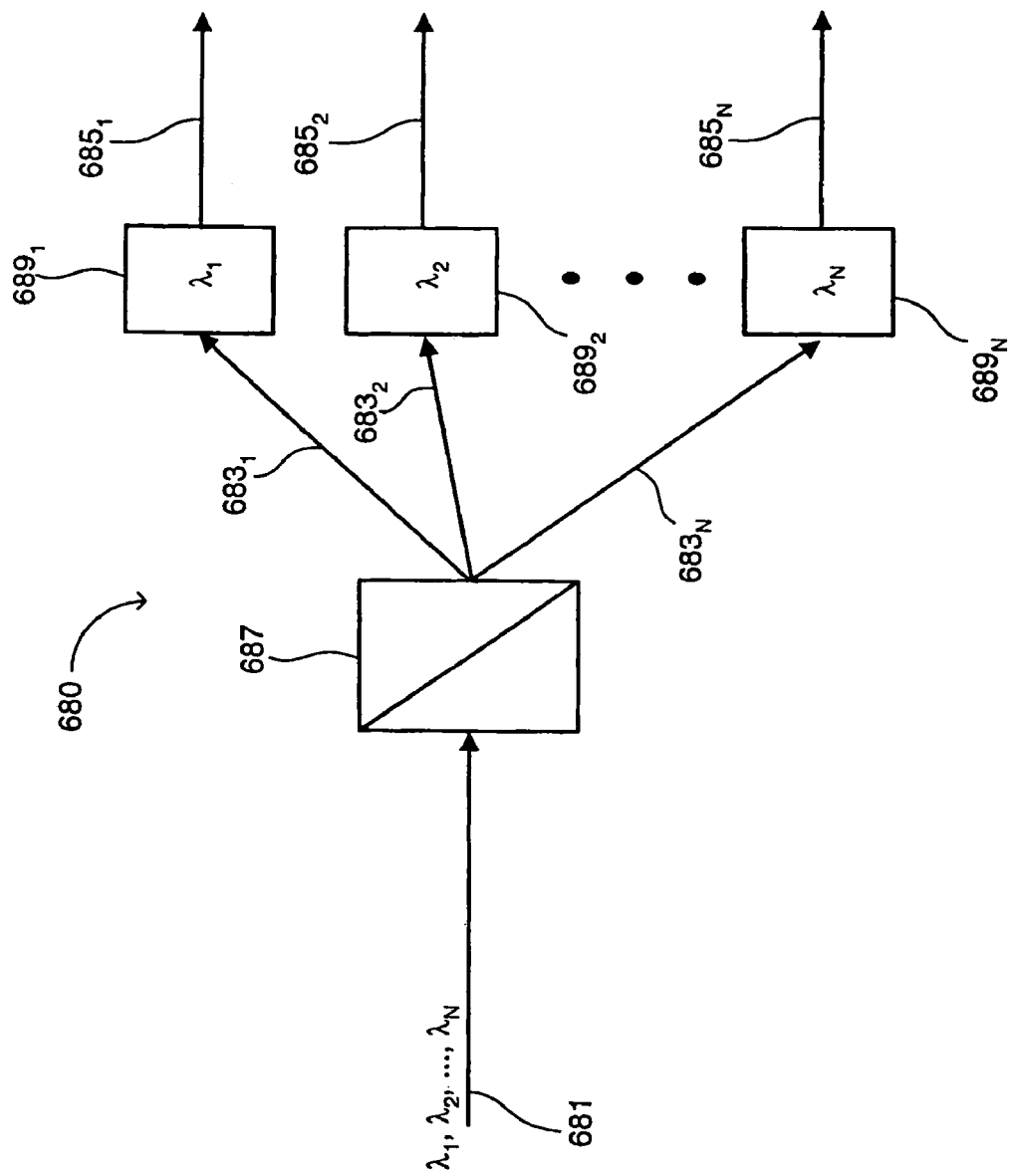
FIG. 12B is a schematic illustration of a wavelength separator, which may be used as another preferable embodiment for the separator of FIG. 11, constructed and operative in accordance with another preferred embodiment of the present invention.

Reference is further made to FIG. 12B, which is a schematic illustration of a wavelength separator, generally referenced 680, constructed and operative in accordance with another preferred embodiment of the present invention. Wavelength separator 680 may be used as a preferable embodiment for separator 609 in FIG. 11. Wavelength separator 680 includes a beam splitter 687 and a plurality of wavelength filters $689_1$, $689_2$ and $689_N$. Each of wavelength filters $689_1$, $689_2$ and $689_N$ is a device which emits an outgoing light beam at a selected wavelength, when an incoming light beam composed of different wavelengths, enters a wavelength filter. Beam splitter 687 receives an incoming light beam 681. Incoming light beam 681 is composed of a plurality of components at wavelengths $\lambda_1$, $\lambda_2$ and $\lambda_N$. Beam splitter 687 splits incoming light beam 681 to a plurality of light beams $683_1$, $683_2$ and $683_N$. The splitting is equivalent to apportioning of light beam 681 into N Light beams and channeling each of so apportioned light beam $683_i$ (i=1, 2, ... N) into N different direction. 683 The characteristics of light beams $683_1$, $683_2$ and $683_N$ are substantially the same as the characteristics of incoming light beam 681. However, the intensities of each of light beams $683_1$, $683_2$ and $683_N$ and even the sum of their intensities is equal or less than the intensity of incoming light beam 681, (unless some intensity amplification is applied). Beam splitter 687 directs light beams 683₁, 683₂ and 683_N to wavelength filters 689₁, 689₂ and 689_N, respectively. Wavelength filters 689₁, 689₂ and 689_N emit outgoing light beams 685₁, 685₂ and 685_N, respectively, at wavelengths $\lambda_1$, $\lambda_2$ and $\lambda_N$, respectively.

It is noted that light sources suitable for application with the present invention are readily available. This is true for an optical system which may well include a plurality of optical elements, gates, junctions, constructed according to the present invention. Different light sources can be used together with a processor constructed according to the present invention, such as micro-lasers, masers—currently used in conventional CD writers or CD-ROM appliances, nano-lasers, hot diode lasers, natural sun light or other ambient light, and the like. The incoming light beam can enter a complex device such as an optical processor through a single inlet and directed to different regions in the processor or from several sources that provide light to key locations in the processor, using suitable filter, that filters out all wavelengths except those to be used. It is furthermore noted that in addition to optical transistors, other optical devices which operate similar to electronic devices, such as diodes, coils, capacitors, inverters, resistors, and the like, can be constructed according to the present invention.

According to another aspect of the present invention, a phase shifter is coupled to an inlet of a junction gate. The phase shifter shifts the phase of an incoming light beam entering the inlet, relative to the phase of another incoming light beam which enters the junction gate through another inlet of the junction gate.

Figure 13:
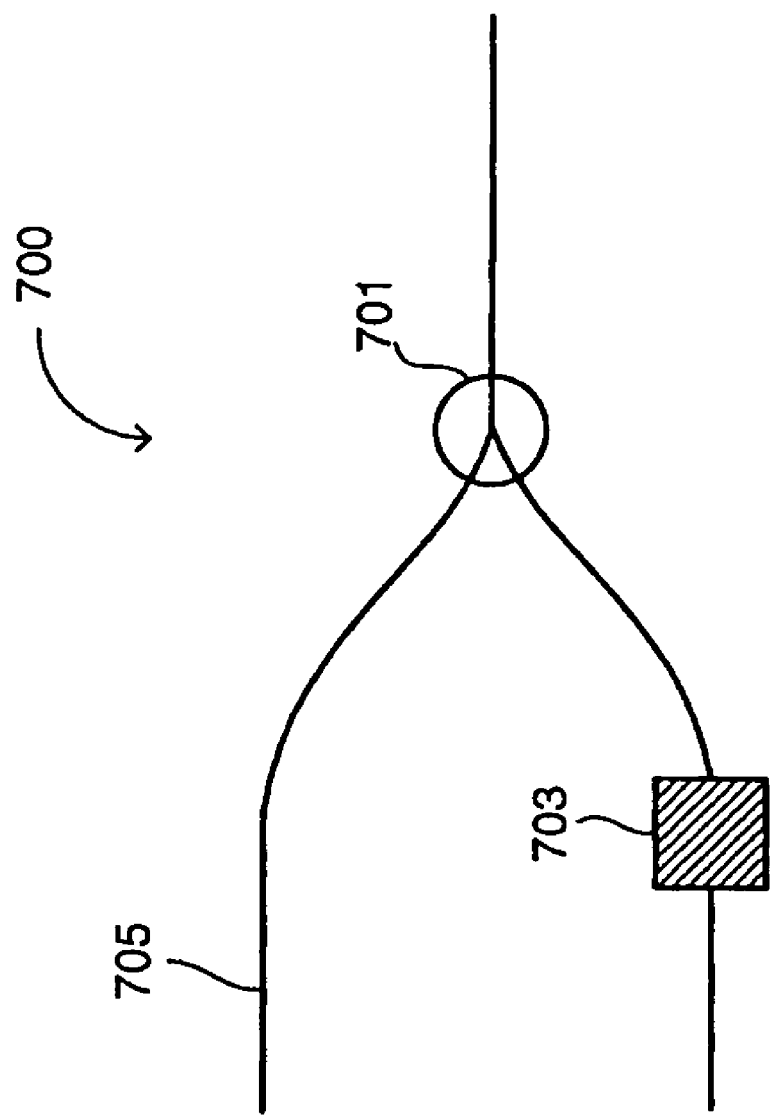
FIG. 13 is a schematic illustration of an optical circuit portion including an optical inverter, constructed and operative in accordance with a further preferred embodiment of the present invention.

Reference is now made to FIG. 13, which is a schematic illustration of an optical circuit portion, generally referenced 700, constructed and operative in accordance with a further preferred embodiment of the present invention. Optical circuit portion 700 includes a junction gate 701 and a phase shifter 703. One of the inlets of junction gate 701 is coupled to phase shifter 703. Phase shifter 703 is a device which emits an outgoing light beam with a phase which is shifted relative to the phase of an incoming light beam entering phase shifter 703. Phase shifter 703 is a light conveying medium, of a length different than the length of a reference conveying medium coupled to inlet 705 of junction gate 701. Alternatively, phase shifter 703 is a conveying medium of a length substantially equal to the length of the reference conveying medium, but made of a material different from the material of the reference conveying medium, herein below referred to as "reference material". It is noted that the types of phase shifters described herein above is not exhaustive and that phase shifter 703 can be constructed according to other concepts. If the index of refraction of the material of phase shifter 703 is different from that of the reference material, then a light beam travels through phase shifter 703, at a speed different than the speed of another light beam which travels through the reference conveying medium. Thus phase shifter acquires different phase shift when reaching gate 701. It is noted that optical circuit portion 700 may further include additional junction gates, fibers, other optical or non-optical devices, a combination thereof, and the like. Phase shifter 703 may be constructed so that light traveling there through acquires a phase shift of $\pi$. Hence, phase shifter 703 may operate as an optical inverter, or a logical NOT gate.

According to another aspect of the present invention, an optical resistor is coupled to a junction outlet of a junction gate. The optical resistor emits an outgoing light beam of an intensity that is lower than that of a resultant light beam which is a superposition of two incoming light beams entering the junction gate through each of the two inlets of the junction gate.

Figure 14:
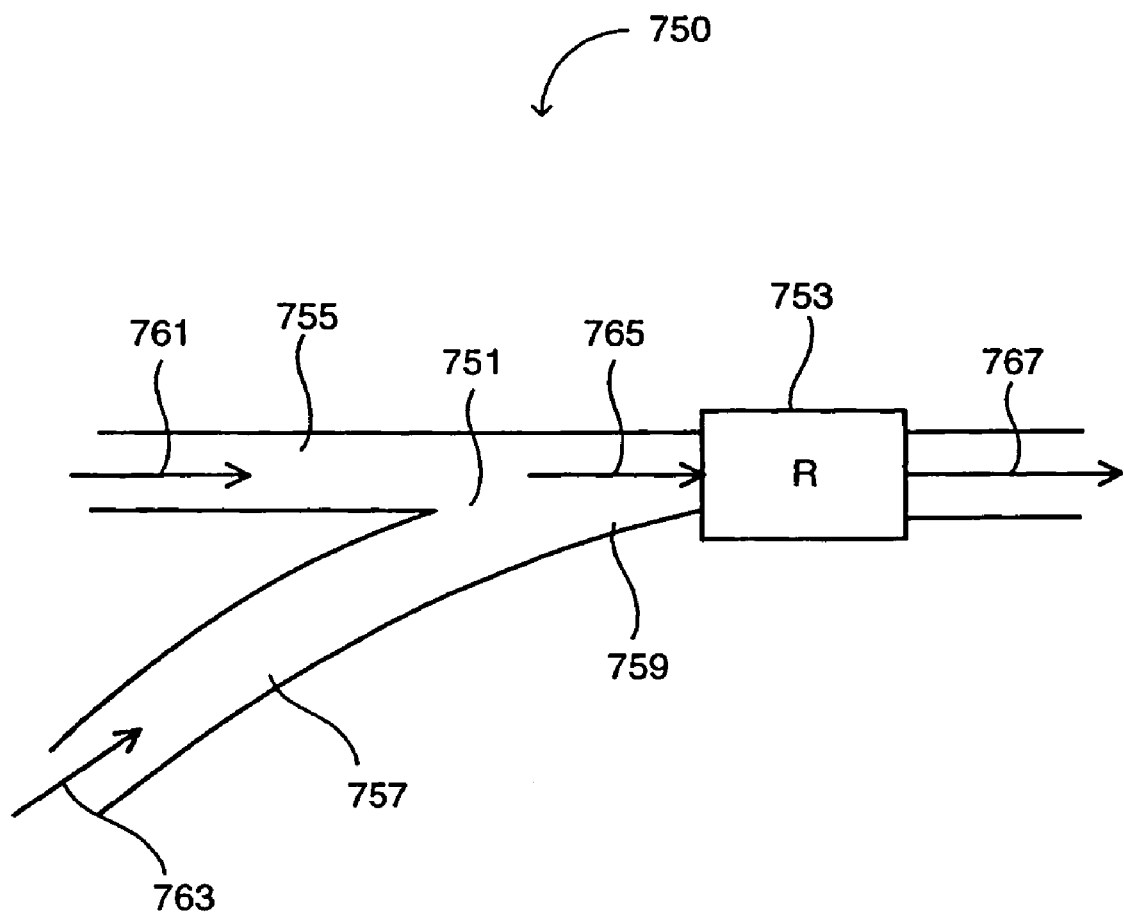
FIG. 14 is a schematic illustration of a circuit portion including an optical resistor, constructed and operative in accordance with another preferred embodiment of the present invention.

Reference is now made to FIG. 14, which is a schematic illustration of an optical circuit portion, generally referenced 750, constructed and operative in accordance with another preferred embodiment of the present invention. Optical circuit portion 750 includes a junction gate 751 and an optical resistor 753. Junction gate 751 includes junction inlets 755 and 757 and a junction outlet 759. Junction outlet 759 is coupled to optical resistor 753. Light beams 761 and 763 enter junction inlets 755 and 757, respectively. Light beams 761 and 763 are superposed at junction outlet 759, as described herein above in connection with FIG. 1, thereby producing a resultant light beam 765. Resultant light beam 765 enters optical resistor 753 and optical resistor 753 emits an outgoing light beam 767. The frequency spectrum, polarization components and phase shift components of light beams 765 and 767 are identical. However, light beam 767 has a lower intensity than light beam 765. The intensity of light beam 767 may be proportional to the intensity of light beam 765 (i.e., the intensity of light beam 767 may be equal to a predetermined fraction of the intensity of light beam 765). Alternatively, optical resistor 753 may limit the intensity of light beam 767 to a predetermined cut-off value. For example, if incoming light beams 761 and 763 have an equal intensity I, then the intensity of superposed light beam 765 is 2I. If optical resistor 753 reduces the intensity of light beam 765 by 50%, then the intensity of light beam 767 is also I. This may be beneficial since light beam 767 has the same intensity as light beams 761 and 763, and can thus be used in the same way as light beams 761 and 763, for devices whose performance is affected by or is sensitive to light intensity.

Figure 15A:
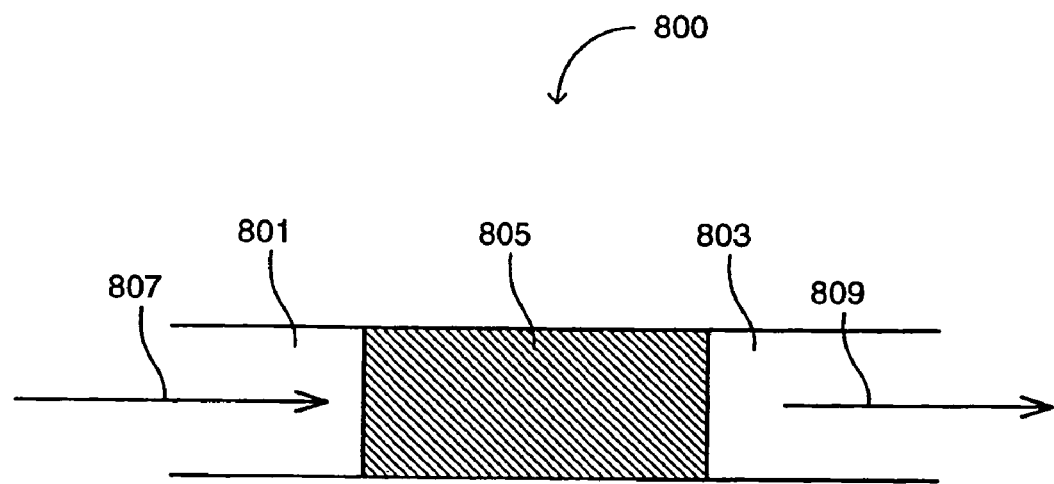
FIG. 15A is a schematic illustration of an optical resistor, constructed and operative in accordance with a further preferred embodiment of the present invention.
Figure 15B:
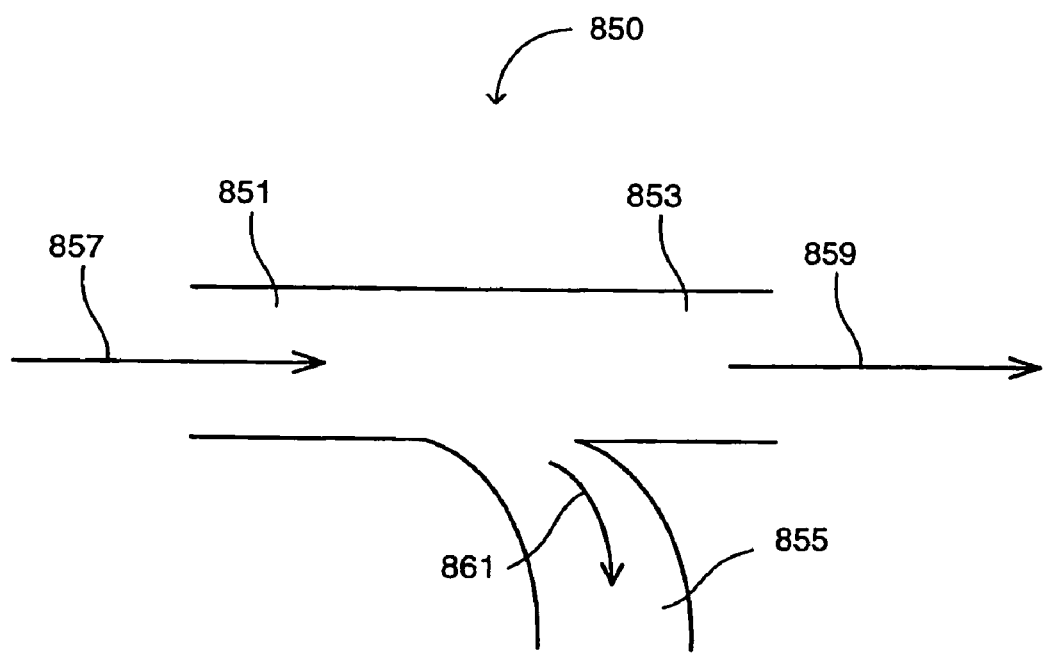
FIG. 15B is a schematic illustration of an optical resistor, constructed and operative in accordance with another preferred embodiment of the present invention.

Reference is now made to FIGS. 15A and 15B. FIG. 15A is a schematic illustration of an optical resistor, generally referenced 800, constructed and operative in accordance with a further aspect of the present invention. FIG. 15B is a schematic illustration of another optical resistor, generally referenced 850, constructed and operative in accordance with another aspect of the present invention.

With reference to FIG. 15A, optical resistor 800 includes an inlet 801, an outlet 803, and an absorbent material 805. A light beam 807 enters inlet 801. Light beam 807 passes through absorbing material 805. Absorbent material 805 absorbs a portion of light beam 807. Optical resistor 800 emits a light beam 809 through outlet 803. The frequency spectrum, polarization components and phase-shift components are identical for light beam 807 and 809. However, light beam 809 has a lower intensity, since a portion of the intensity is absorbed by absorbent material 805. It will be noted that absorbent material 805 is heated by the absorption of light, and that if such heating is significant, especially in devices that include a multiplicity of such resistors, it may require the cooling of resistor 800 or its neighboring elements.

With reference to FIG. 15B, optical resistor 850 includes an inlet 851, a first outlet 853, and a second outlet 855. A light beam 857 enters inlet 851. Light beam 857 splits between the two outlets 853 and 855. Light beam 857 is partially emitted through outlet 853 as a light beam 859, and partially through outlet 855 as a light beam 861. Thus, a portion of the intensity of light beam 857 is referenced to outlet 855 and is deprived from light beam 859. The frequency spectrum, polarization components and phase shift components are substantially identical for light beams 857, 859 and 861. However, the intensity of light beam 859

(as well as light beam 861) is lower than the intensity of light beam 857, since a portion of the intensity is referenced to outlet 855. Light beam 861 may be channeled to a "drainage", in which part or all of such excessive light is collected from similar resistors or other excessive light sources. Thereby, such excessive light is eventually removed without producing significant heating. For example, optical conveyers may channel all drained light to a light emitter that emits the light toward a non damaging direction, such as the surrounding space. It will be noted that light beam 861 is not necessarily excessive and may be used for purposes similar to those for which light beam 859 is used, or other purposes.

Figure 16:
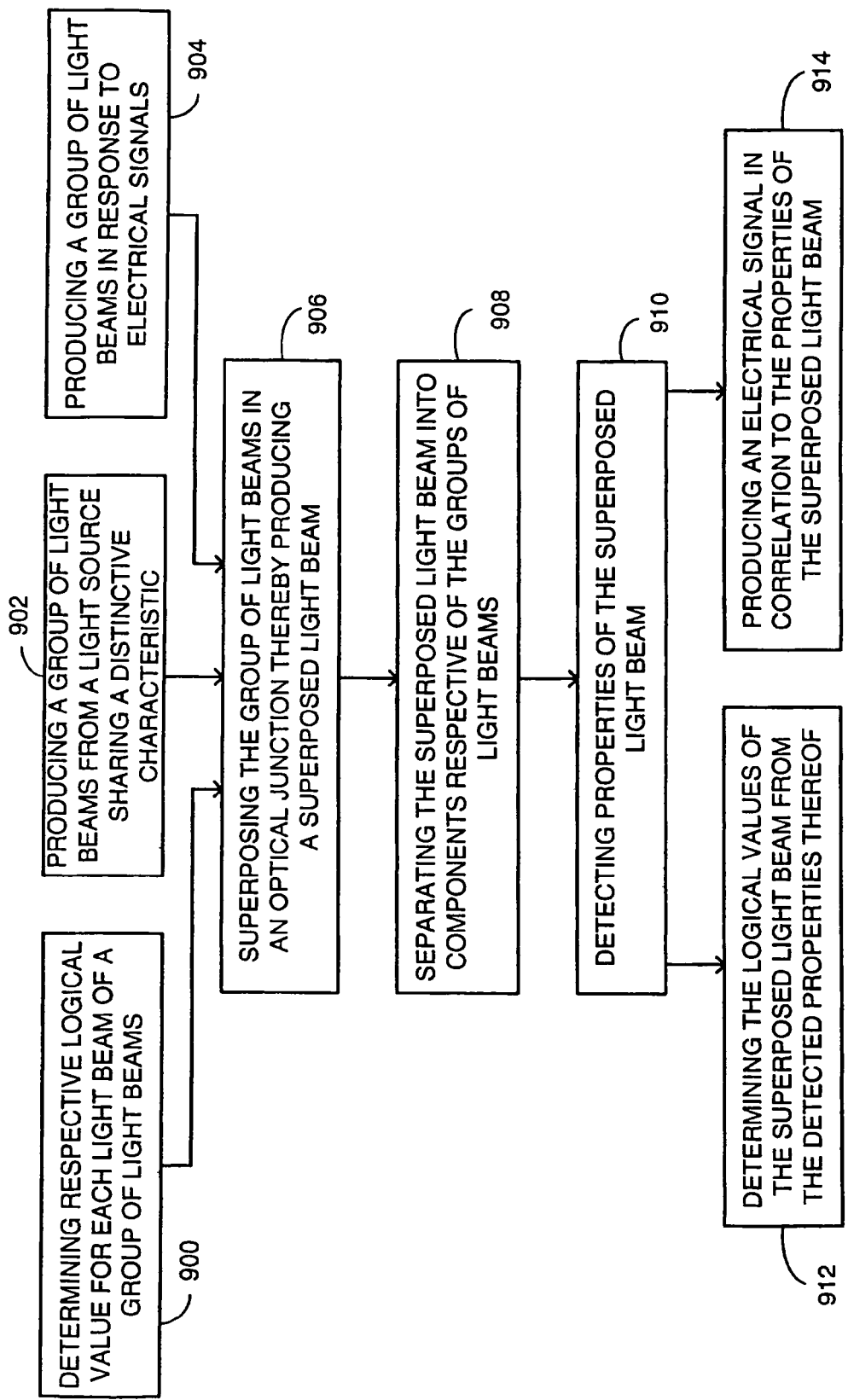
FIG. 16 is a schematic illustration of a method for operating the system of FIG. 1, operative in accordance with a further preferred embodiment of the present invention.

Reference is now made to FIG. 16, which is a schematic illustration of a method for operating system 100 of FIG. 1, operative in accordance with another preferred embodiment of the present invention. In procedure 900, a respective logical values is determined for each light beam of a group of light beams. Usually, the logical value is determined in pursuance of the properties of the light beam, such as phase shift or amplitude. For example, with reference to FIG. 1, assuming that light beams 7 and 9 are in anti-phase, logical values of "0" and "1" may be determined for light beams 7 and 9, respectively. It is noted that the choice of the first logical value, (i.e., for light beam 7 in this case) depends on the predetermined system definitions, and that the second logical value (i.e., for light beam 9) depends on the phase shift difference between light beams 7 and 9.

In procedure 902, a group of light beams is produced from a light source (or a plurality of light sources). In the example set forth in FIG. 1, light beams 7 and 9 are produced from an external light source (not shown). In case of parallel processing, a plurality of groups of light beams are produced, each group with a distinctive characteristic such as a specific frequency or a specific polarity, which is common to the group but distinguishable with respect to other groups. In the example set forth in FIG. 9, two groups of light are produced. A first group has a first polarity direction and a second group has a second polarity direction which is orthogonal to the first polarity direction. In the example set forth in FIG. 11, N groups of light beams are applied through L incoming light beams. Each group "i" (i=1, 2, . . . N) of light beams distinctively shares a common wavelength $\lambda_i$, that reach junction gate 601 in L components. Each component "j" (j=1, 2, . . . L) is a component of an incoming light beam $615_j$.

In procedure 904, a group of light beams is produced in response to electrical signals. In the example set forth in FIG. 4A, optical signal 333 is produced in response to electrical signal 325. It will be noted that procedure 904 is optional—it is employed only where association to electric circuitry is required.

In procedure 906, the group of light beams is superposed in an optical junction, thereby producing a superposed light beam. In the example set forth in FIG. 1, light beam 13 is produced from superposing light beams 7 and 9. In the example set forth in FIG. 11, light beam 619 is produced from superposing light beams $615_1$, $615_2$ and $615_L$.

In procedure 908, the superposed light beam is separated into components respective of the groups of light beams. It is noted that this procedure is applied only in cases where at least two groups of light beams are superposed in the optical junction gate. It is further noted that after separation, light beams of the same group are superposed together, while light beams from different groups are not superposed together. The characteristic common to each group but distinct in respect to other groups is used to separate between the groups. In the example set forth in FIG. 11, the N components of superposed light beam 619 originate from L light beams $615_1$, $615_2$, and $615_L$, which are then separated into N light beams $621_1$, $621_2$, and $621_N$, —each of which has a specific wavelength $\lambda_i$, which is distinctively respective of one group of light beams only. In the example set forth in FIG. 9, the components of superposed light beam 523 are separated into outgoing light beams 525 and 527, wherein light beam 525 is polarized in a direction normal to that of light beam 527. In the example set forth in FIG. 11, the components of superposed light beam 619 are separated into N outgoing light beams $621_i$, each such light beam has a distinctive wavelength $\lambda_i$.

In procedure 910, properties of the superposed light beam are detected. In the example set forth in FIG. 1, screen 15 is used to determine whether the components of light beam 13 are in phase, anti-phase or out of phase. The amplitude of the components can be used as an additional or an alternative property.

In procedure 912, the logical values of the superposed light beam are determined from the detected properties thereof. For example, with reference to FIG. 1, assuming that the components of light beam 13 are identified in anti-phase at screen 15, thus determining a logical value of "0" for light beam 13.

In procedure 914, an electrical signal is produced in response to the detected properties of the superposed light beam. This can be also in response or in correlation to the logical values determined in procedure 912. With reference to FIG. 3, electrical signal 313 is produced in response to optical signal 309. It will be noted that procedure 914 is optional—it is employed only where association to electric circuitry is required.

It will be appreciated by persons skilled in the art, that the present invention is not limited to what has been particularly shown and described hereinabove. Rather the scope of the present invention is defined only by the claims, which follow.

The invention claimed is:

1. A logical element for executing logical operations, comprising:
    an optical junction;
    at least two optical inlets, coupled to said optical junction, for receiving at least two incoming light beams;
    at least one optical outlet, coupled to said optical junction, at which at least one outgoing light beam is emitted; and
    at least one detector for detecting at least one property of said outgoing light beam received from said at least one optical outlet,
    wherein said at least two incoming light beams are superposed at said optical junction, thereby producing said at least one outgoing light beam,
    wherein said at least one property of said outgoing light beam depends on the relative phase shift of said at least two incoming light beams,
    wherein said relative phase shift comprises a fraction of a cycle ($2\pi$) of any value in the range of $0$–$2\pi$, said range including $0$ and $2\pi$, and
    wherein at least one of said at least one detector comprises an optical detector positioned to measure the light intensity in at least one specific zone of the interference pattern formed by said outgoing light beam received from said at least one optical outlet, whereby said light intensity is a function of said relative phase shift.

2. The logical element according to claim 1, wherein said at least one zone comprises a Fresnel Zone.

3. The logical element according to claim 2, wherein said Fresnel Zone is the central Fresnel Zone.

4. The logical element according to claim 1, further comprising an electro-optic converter, coupled to at least one of said optical inlets.

5. The logical element according to claim 4, wherein said electro-optic converter comprises at least one light-emitting diode.

6. The logical element according to claim 1, further comprising an opto-electric converter, coupled to at least one of said at least one optical outlet.

7. The logical element according to claim 6, wherein said opto-electric converter comprises at least one photodiode.

8. The logical element according to claim 1, further comprising a light separator, for separating into components said outgoing light beam, wherein said components are defined by at least one characteristic.

9. The logical element according to claim 8, wherein said at least one characteristic comprises the wavelength of said outgoing light beam or the polarization of said outgoing light beam.

10. The logical element according to claim 8, wherein said light separator comprises at least one dispersive prism.

11. The logical element according to claim 8, wherein said light separator comprises:
   at least one beam-splitter; and
   at least two wavelength filters.

12. The logical element according to claim 8, wherein said light separator comprises at least one birefringent material.

13. The logical element according to claim 8, wherein said light separator comprises:
   at least one beam-splitter; and
   two polarizers.

14. An optical system, comprising a plurality of optical logical elements for executing logical operations, each optical logical element of said plurality of optical logical elements comprising:
   an optical junction;
   at least two optical inlets, coupled to said optical junction for receiving at least two incoming light beams;
   at least one optical outlet, coupled to said optical junction, at which at least one outgoing light beam is emitted; and
   at least one detector for detecting at least one property of outgoing light beam received from said at least one optical outlet,
   wherein said at least two incoming light beams are superposed at said optical junction, thereby producing said at least one outgoing light beam,
   wherein said at least one property of said outgoing light beam depends on the relative phase shift of said at least two incoming light beams,
   wherein said relative phase shift comprises a fraction of a cycle ($2\pi$) of any value in the range of $0$–$2\pi$, said range including $0$ and $2\pi$, and
   wherein at least one of said at least one detector comprises an optical detector positioned to measure the light intensity in at least one specific zone of the interference pattern formed by said at least one outgoing light beam received from said at least one optical outlet, whereby said light intensity is a function of said relative phase shift.

15. The optical system according to claim 14, wherein at least one of said plurality of optical logical elements further comprises at least one phase shifter.

16. The optical system according to claim 15 wherein said at least one phase shifter shifts the phase of light passing there through by one half of a cycle ($\pi$).

17. The optical system according to claim 15, wherein at least one of said at least one phase shifter is coupled to at least one of said at least one optical outlet.

18. The optical system according to claim 15, wherein at least one of said at least one phase shifter is coupled to at least one of said at least two optical inlets.

19. The optical system according to claim 15, wherein at least one of said at least one phase shifter is coupled to at least one optical outlet of at least one of said plurality of optical logical elements, and further coupled to at least one optical inlet of at least another one of said plurality of optical logical elements.

20. The optical system according to claim 14, wherein at least one of said plurality of optical logical elements comprises at least one optical resistor.

21. The optical system according to claim 20, wherein at least one of said at least one optical resistor is coupled to at least one of said at least one optical outlet.

22. The optical system according to claim 20, wherein at least one of said at least one optical resistor is coupled to at least one of said at least two optical inlets.

23. The optical system according to claim 20, wherein at least one of said at least one optical resistor is coupled to at least one optical outlet of at least one of said plurality of optical logical elements, and further coupled to at least one optical inlet of at least another one of said plurality of optical logical elements.

24. A method for performing logical operations, comprising:
   providing at least one group of light beams, each light beam in a respective group of said at least one group of light beams being defined by at least one property, and all light beams in a respective group of said at least one group of light beams sharing at least one distinctive characteristic;
   superposing said all light beams in a respective group of said at least one group of light beams in an optical junction, thereby producing at least one superposed light beam sharing said distinctive characteristic; and
   detecting said at least one property of said at least one superposed light beam by measuring the light intensity in at least one predetermined location.

25. The method according to claim 24, wherein said at least one property comprises the phase shift.

26. The method according to claim 24, wherein said at least one property comprises the amplitude.

27. The method according to claim 24, wherein each light beams in a respective group of said at least one group of light beams has a respective phase shift and amplitude.

28. The method according to claim 27, wherein each combination of said phase shifts and amplitudes defines a predetermined logical value.

29. The method according to claim 24, wherein said at least one distinctive characteristic is selected from the list consisting of:
   a wavelength; and
   an orthogonal polarization direction.

30. The method according to claim 24, further comprising the step of determining a logical value for the detected at least one property of said at least one superposed light beam.

31. The method according to claim 24, wherein said step of providing said at least one group of light beams comprises providing said at least one group of light beams from at least one light source.

32. The method according to claim 24, wherein said step of producing at least one of providing said at least one group of light beams comprises providing said at least one group of light beams in response to at least one electrical signal.

33. The method according to claim 32, wherein at least one of said at least one group of light beams is produced from said at least one electrical signal using at least one light emitting diode.

34. The method according to claim 24, further comprising the step of producing at least one electrical signal in correlation to the detected at least one property of said at least one superposed light beam.

35. The method according to claim 34, wherein said at least one electrical signal is produced using at least one photodiode.

36. The method according to claim 24, wherein said at least one property of said at least one superposed light beam comprises the relative phase shift among at least two light beams in a respective group of said at least one group of light beams, wherein said relative phase shift comprises a fraction of a cycle ($2\pi$) of any value in the range of $0$–$2\pi$, said range including 0 and $2\pi$.

37. The method according to claim 24, wherein said at least one property of said at least one superposed light beam is detected using at least one optical detector.

38. The method according to claim 24, wherein said at least one predetermined location is a Fresnel Zone.

39. The method according to claim 38, wherein said Fresnel Zone is the central Fresnel Zone.

40. The method according to claim 24, further comprising changing the phase shift of at least one light beam of said group of light beams.

41. The method according to claim 24, further comprising changing the phase shift of at least one of said at least one superposed light beam.

42. The method according to claim 40, wherein said phase shift of at least one light beam of said group of light beams is changed by one half of a cycle.

43. The method according to claim 42, wherein said step of changing further comprises directing at least one of said light beams through at least one phase shifter.

44. The method according to claim 43, wherein said phase shifter is made of a material having an index of refraction which is different than the index of refraction of a reference material.

45. The method according to claim 43, wherein said phase shifter is made of a conveying medium, the length of said conveying medium is different than that of a reference conveying medium.

46. The method according to claim 24, further comprising the step of separating each of said at least one superposed light beam according to said distinctive characteristic.

47. The method according to claim 46, wherein said at least one distinctive characteristic comprises wavelength; and
wherein said step of separating further comprises;
directing said at least one superposed light beam through at least one wavelength filter, wherein said at least one wavelength filter admits only light of a wavelength which is substantially equal to the wavelength of a respective group of said at least one group of light beams.

48. The method according to claim 47, wherein said at least one distinctive characteristic comprises wavelength; and wherein said step of separating further comprises directing said at least one superposed light beam through at least one dispersive prism.

49. The method according to claim 46, wherein said at least one distinctive characteristic comprises polarization; and
wherein said step of separating further comprises:
directing said at least one superposed light beam through at least one polarization filter, wherein said at least one polarization filters admits only light of a polarization which is substantially equal to the polarization of a respective group of said at least one group of light beams.

50. The method according to claim 46, wherein said at least one distinctive characteristic comprises polarization; and
wherein said step of separating further comprises directing at least one of said superposed light beams through at least one birefringent material.

51. The method according to claim 46, wherein said at least one distinctive characteristic comprises polarization and wavelength.

52. The method according to claim 24, further comprising superposing said at least one superposed light beam on at least one additional light beam in at least one additional optical junction.

53. The method according to claim 52, wherein at least one outlet of said optical junction is optically coupled to at least one inlet of said additional optical junction.

54. The method according to claim 52, further comprising changing the amplitude of said at least one superposed light beam before superposing said at least one superposed light beam on said at least one additional light beam.

55. The method according to claim 54, wherein said step of changing further comprises reducing said amplitude, by employing at least one optical resistor.

56. The method according to claim 54, wherein said step of changing further comprises equalizing said amplitude to the amplitude of said at least one additional light beam, by employing at least one optical resistor.

57. The logical element according to claim 1, wherein said at least one property of said outgoing light beam depends on the amplitudes of said at least two incoming light beams.

58. The logical element according to claim 1, wherein said logical operations comprise Boolean operations.

59. The logical element according to claim 1, wherein said logical operations comprise non-Boolean operations.

60. The logical element according to claim 1, wherein said logical element is implemented in an optical system.

61. An optical processor comprising a plurality of optical logical elements for executing operations in parallel, each optical logical element of said plurality of optical logical elements comprising:
an optical junction;
at least two optical inlets, coupled to said optical junction, for receiving at least two incoming light beams;
at least one optical outlet, coupled to said optical junction, at which at least one outgoing light beam is emitted; and
at least one detector, for detecting at least one property of said outgoing light beam received from said at least one optical outlet,
wherein said at least two incoming light beams are superposed at said optical junction, thereby producing said at least one outgoing light beam, wherein said at least one property of said outgoing light beam depends on the relative phase shift of said at least two incoming light beams, wherein said relative phase shift comprises a fraction of a cycle (2π) of any value in the range of 0–2π, said range including 0 and 2π, and wherein at least one of said at least one detector comprises an optical detector positioned to measure the light intensity in at least one specific zone of the interference pattern formed by said at least one outgoing light beam received from said at least one optical outlet, whereby said light intensity is a function of said relative phase shift.

62. The optical processor according to claim 61, wherein said operations comprise multiple logical operations.

63. The optical processor according to claim 61, wherein said operations comprise switching actions.

64. The optical processor according to claim 61, further comprising a light separator, for separating into components said outgoing light beam, wherein said components are defined by at least one characteristic.

65. The optical processor according to claim 64, wherein said at least one characteristic comprises the wavelength of said outgoing light beam or the polarization of said outgoing light beam.

66. The optical processor according to claim 64, wherein said light separator comprises at least one dispersive prism.

67. The optical processor according to claim 64, wherein said light separator comprises:
at least one beam-splitter; and
at least two wavelength filters.

68. The optical processor according to claim 64, wherein said light separator comprises at least one birefringent material.

69. The optical processor according to claim 64, wherein said light separator comprises:
at least one beam-splitter; and
two polarizers.

70. The optical processor according to claim 64, further comprising at least one respective detector for each separated light component of said outgoing light beam.

71. The optical processor according to claim 61, wherein each of said at least two incoming light beams comprises two orthogonal polarization directions.

72. The optical processor according to claim 71, wherein each of said two orthogonal polarization directions is common to said at least two incoming light beams.

73. The optical processor according to claim 61, wherein each of said at least two incoming light beams comprises at least two wavelengths.

74. The optical processor according to claim 73, wherein each of said at least two wavelengths is common to at least some of said at least two incoming light beams.

75. The method according to claim 24, wherein said logical operations comprise Boolean operations.

76. The method according to claim 24, wherein said logical operations comprise non-Boolean operations.

77. A logical element for executing logical operations, comprising:
an optical junction;
at least two optical inlets, coupled to said optical junction, for receiving at least two incoming light beams;
at least one optical outlet, coupled to said optical junction, at which at least one outgoing light beam is emitted; and
at least one detector for detecting at least one property of said outgoing light beam received from said at least one optical outlet, wherein said at least two incoming light beams are superposed at said optical junction, thereby producing said at least one outgoing light beam, wherein said at least one property of said outgoing light beam depends on the relative phase shift of said at least two incoming light beams, wherein said relative phase shift comprises a fraction of a cycle (2π) of any value in the range of 0–2π, said range including 0 and 2π, and wherein said logical operations are selected from the list consisting of:
OR operations,
NAND operations,
NOR operations,
XOR operations,
NXOR operations,
NOT operations, and
non-Boolean operations.

78. A logical element for executing logical operations, comprising:
an optical junction;
at least two optical inlets, coupled to said optical junction, for receiving at least two incoming light beams;
at least one optical outlet, coupled to said optical junction, at which at least one outgoing light beam is emitted; and
at least one detector for detecting at least one property of said outgoing light beam received from said at least one optical outlet, wherein said at least two incoming light beams are superposed at said optical junction, thereby producing said at least one outgoing light beam, wherein said at least one property of said outgoing light beam depends on the relative phase shift of said at least two incoming light beams, wherein said relative phase shift comprises a fraction of a cycle (2π) of any value in the range of 0–2π, said range including 0 and 2π, and wherein the optical path from any of said at least two optical inlets to said at least one optical outlet does not exceed a length of 1 meter.

79. The logical element according to claim 78, wherein said optical path does not exceed a length of 1 micron.

80. The logical element according to claim 78, wherein the width of said optical path is on the nanometer scale.

81. An optical processor having a three-dimensional structure and comprising at least two layers and a plurality of optical logical elements for executing logical operations, each optical logical element of said plurality of optical logical elements comprising:
an optical junction;
at least two optical inlets, coupled to said optical junction, for receiving at least two incoming light beams;
at least one optical outlet, coupled to said optical junction, at which at least one outgoing light beam is emitted; and
at least one detector for detecting at least one property of said outgoing light beam received from said at least one optical outlet, wherein said at least two incoming light beams are superposed at said optical junction, thereby producing said at least one outgoing light beam, wherein said at least one property of said outgoing light beam depends on the relative phase shift of said at least two incoming light beams, wherein said relative phase shift comprises a fraction of a cycle ($2\pi$) of any value in the range of $0$–$2\pi$, said range including $0$ and $2\pi$, wherein at least one optical outlet of at least one of said plurality of optical logical elements is optically coupled to at least one optical inlet of at least another one of said plurality of optical logical elements, wherein each of said at least two layers comprises at least one of said plurality of optical logical elements, wherein at least two of said at least two layers are optically coupled, and wherein at least one of said at least one detector comprises an optical detector positioned to measure the light intensity in at least one specific zone of the interference pattern formed by said at least one outgoing light beam received from said at least one optical outlet, whereby said light intensity is a function of said relative phase shift.

* * * * *